US009844871B2

(12) United States Patent
Goodwin et al.

(10) Patent No.: US 9,844,871 B2
(45) Date of Patent: Dec. 19, 2017

(54) AUTOMATED MOUNTING AND POSITIONING APPARATUS FOR INCREASED USER INDEPENDENCE

(71) Applicant: BlueSky Designs, Inc., Minneapolis, MN (US)

(72) Inventors: Dianne M. Goodwin, St. Paul, MN (US); Martin W. Stone, Arden Hills, MN (US); Nicholas K. Lee, St. Paul, MN (US); Karl W. Brown, Minneapolis, MN (US)

(73) Assignee: BLUESKY DESIGNS, INC., Minneapolis, MN (US)

( * ) Notice: Subject to any disclaimer, the term of this patent is extended or adjusted under 35 U.S.C. 154(b) by 242 days.

(21) Appl. No.: 14/586,618

(22) Filed: Dec. 30, 2014

(65) Prior Publication Data

US 2015/0251322 A1    Sep. 10, 2015

Related U.S. Application Data

(63) Continuation-in-part of application No. 14/536,612, filed on Nov. 8, 2014.
(Continued)

(51) Int. Cl.
*B25J 9/10* (2006.01)
*B25J 11/00* (2006.01)
(Continued)

(52) U.S. Cl.
CPC ............... *B25J 9/102* (2013.01); *A61G 5/10* (2013.01); *A61G 5/1094* (2016.11); *B25J 9/06* (2013.01);
(Continued)

(58) Field of Classification Search
CPC ........... B25J 9/102; A61G 5/1094; A61G 5/10
See application file for complete search history.

(56) References Cited

U.S. PATENT DOCUMENTS 6,157,162 A * 12/2000 Hayashi .............. B60L 11/1818
320/104
7,426,970 B2    9/2008 Olsen
(Continued)

FOREIGN PATENT DOCUMENTS

WO        9417964 A1    8/1994
WO     2005074371 A2    8/2005
(Continued)

OTHER PUBLICATIONS

Alley, "The Raptor," Advance Healthcare Network for Occupational Therapy Practitioners, vol. 17, No. 19, p. 37, available at http://occupational-therapy.advanceweb.com/Article/The-Raptor.aspx, 2001.
(Continued)

*Primary Examiner* — David M Fenstermacher
(74) *Attorney, Agent, or Firm* — Seager, Tufte & Wickhem LLP

(57) ABSTRACT

An accessibility-enhancing joint module may include a housing, a powered motor disposed within the housing, a rotatable receiving member operatively connected to the powered motor, a coupling element configured to attach to the receiving member, and a control board disposed within the housing and operatively connected to the powered motor, wherein the coupling element is disposed external to the housing. An accessibility-enhancing arm assembly may include a first joint module and a second joint module and a tubular arm member attached to the proximal mounting portion of the first joint module and the proximal mounting portion of the second joint module, each joint module including a housing having a body portion and a proximal
(Continued)

mounting portion, a powered motor disposed within the housing, and a rotatable receiving member operatively connected to the powered motor. The joint module(s) and/or the arm assembly may be operable by a variety of accessible controls.

20 Claims, 32 Drawing Sheets

Related U.S. Application Data

(60) Provisional application No. 61/948,304, filed on Mar. 5, 2014.

(51) Int. Cl.
*B25J 13/00* (2006.01)
*B25J 9/06* (2006.01)
*B25J 17/02* (2006.01)
*A61G 5/10* (2006.01)
*A61G 7/05* (2006.01)

(52) U.S. Cl.
CPC ........... *B25J 11/008* (2013.01); *B25J 13/006* (2013.01); *B25J 17/0241* (2013.01); *A61G 7/0503* (2013.01); *Y10S 901/15* (2013.01); *Y10S 901/23* (2013.01); *Y10S 901/25* (2013.01); *Y10S 901/28* (2013.01); *Y10T 74/20317* (2015.01)

(56) References Cited

U.S. PATENT DOCUMENTS

| 7,881,780 | B2 | 2/2011 | Flaherty |
| 8,056,874 | B2 | 11/2011 | Goodwin et al. |
| 8,060,194 | B2 | 11/2011 | Flaherty |
| 8,083,694 | B2 | 12/2011 | Peles |
| 8,160,205 | B2 | 4/2012 | Saracen et al. |
| 8,745,789 | B2 | 6/2014 | Saracen et al. |
| 8,954,195 | B2 | 2/2015 | Summer et al. |
| 8,994,776 | B2 | 3/2015 | Sutherland et al. |
| 2005/0234327 | A1 | 10/2005 | Saracen et al. |
| 2006/0189900 | A1 | 8/2006 | Flaherty |
| 2006/0195042 | A1 | 8/2006 | Flaherty |
| 2006/0293617 | A1 | 12/2006 | Einav et al. |
| 2008/0077057 | A1 | 3/2008 | Peles |
| 2012/0174317 | A1 | 7/2012 | Saracen et al. |
| 2012/0204670 | A1* | 8/2012 | Ryland .................. B08B 9/045 74/490.03 |
| 2013/0025055 | A1 | 1/2013 | Saracen et al. |
| 2013/0046438 | A1 | 2/2013 | Summer et al. |
| 2013/0297066 | A1* | 11/2013 | Alvern .................. G07F 9/023 700/232 |
| 2014/0009561 | A1 | 1/2014 | Sutherland et al. |
| 2014/0296750 | A1 | 10/2014 | Einav et al. |

FOREIGN PATENT DOCUMENTS

| WO | 2005074372 A2 | 8/2005 |
| WO | 2005074373 A2 | 8/2005 |
| WO | 2006082584 A2 | 8/2006 |
| WO | 2006124434 A2 | 11/2006 |
| WO | 2007110391 A2 | 10/2007 |
| WO | 2012061932 A1 | 5/2012 |
| WO | 2013025978 A2 | 2/2013 |

OTHER PUBLICATIONS

"iArm," Exact Dynamics, available at http://www.exactdynamics.nl/site/?page=iarm.

"JACO Arm User Guide," vol. 1.0.7, available at http://www.robotshop.com/media/files/PDF/jaco-arm-user-guide-jaco-academique.pdf.

\* cited by examiner

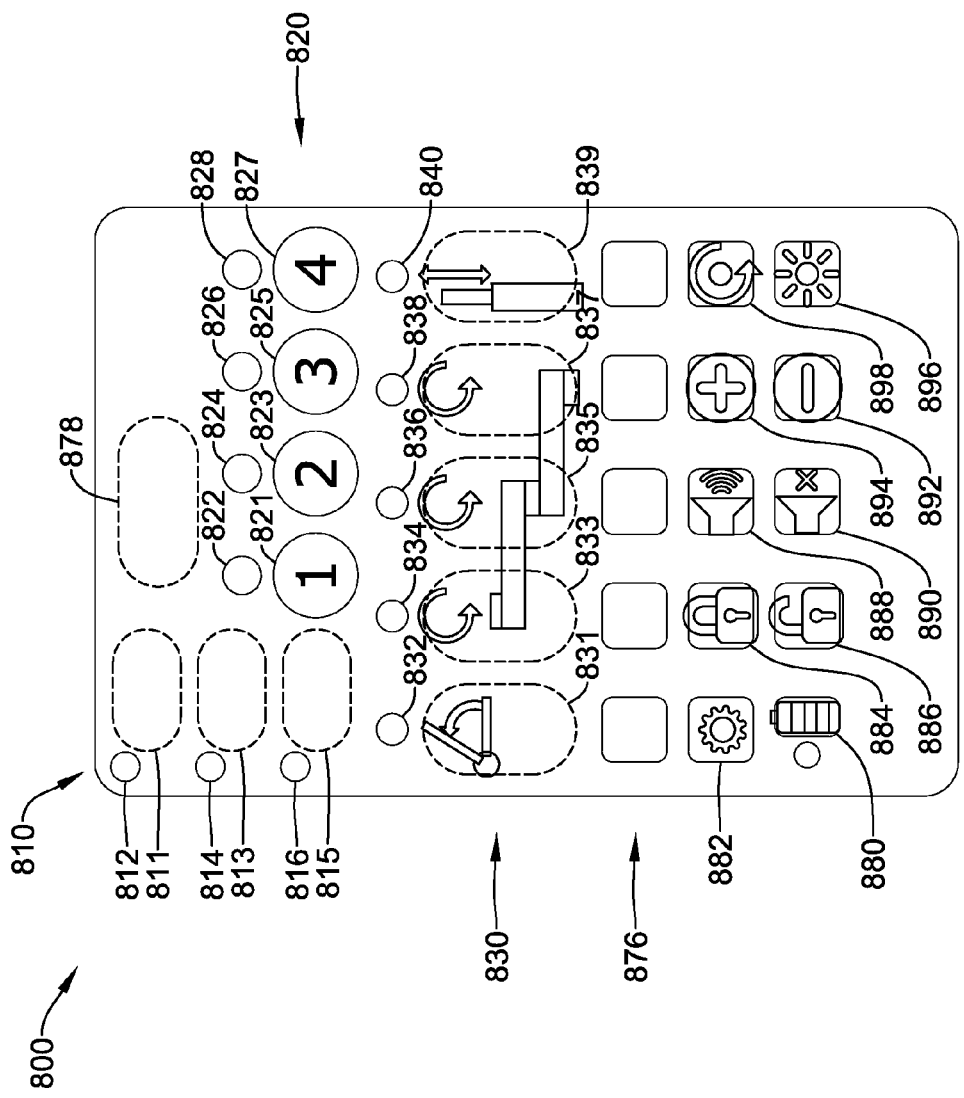

AUTOMATED MOUNTING AND POSITIONING APPARATUS FOR INCREASED USER INDEPENDENCE

CROSS-REFERENCE TO RELATED APPLICATIONS

This application claims priority under 35 U.S.C. §119(e) to U.S. Provisional Application No. 61/948,304, filed Mar. 5, 2014, and is a continuation-in-part of U.S. patent application Ser. No. 14/536,612, filed Nov. 8, 2014, the entire disclosures of which are herein incorporated by reference.

FIELD

The present disclosure relates generally to accessibility-enhancing mounting and positioning apparatuses. More specifically, the present disclosure pertains to versatile positioning apparatuses mountable to a wheelchair or other such device for increasing user independence.

BACKGROUND

The number of individuals using mobility devices such as wheelchairs and walkers is growing at a steady rate as a result of changing age demographics in the population. Approximately 600,000 individuals in the United States use power wheelchairs for mobility purposes, including a large number with significant upper body extremity limitations. Many have diseases or conditions that require constant assistance from a caregiver. In addition, many elderly and individuals recovering from surgery or injuries have temporary or permanent mobility impairments that require them to spend a considerable amount of time in a recliner, bed, or wheelchair, resulting in a loss of independence. With the increasing incidence of disability as a person ages, and the general trend towards an increase in the average age of the population, the number of individuals requiring accessibility and/or mobility devices is expected to rise. In addition, there is a trend towards increased participation in community, school, and work activities by people with mobility impairments.

Robotic manipulator arms, generally focused on reaching, grasping, and performing tasks, have a number of disadvantages for the impaired individual. For example, these systems are typically very expensive and therefore cost prohibitive for many users. Additionally, these systems can be very large and obtrusive, have complex controls, and/or an extremely limited weight/load capacity. For example, the JACO™ arm system from Kinova, Inc. (Montreal, Quebec, Canada) has a maximum weight capacity of 1.5 kg (approximately 3.3 pounds) at mid-range and only 1.0 kg (approximately 2.2 pounds) at end range or full extension. The JACO™ arm is also limited in how long (duration of time) it can carry the load (from about one to about five minutes) depending on the load, and must "rest" between uses. In contrast, a typical laptop computer may weigh from about 4 pounds to over 8 pounds depending on its size and configuration, and it may need to be supported continuously for hours at a time. The cost, complexity, and load limitations of robotic manipulator arms make them unsuitable for many simple, common, everyday accessibility needs.

As a result of the rising demand for accessibility and/or mobility devices, there is an increased need for versatile mounting and positioning technology that permits individuals, particularly those with minimal strength and dexterity, to easily access and use personal devices such as speech devices or laptop computers. For individuals confined to a wheelchair, for example, there is often the need for mounting a tray or other flat surface or receiver to the wheelchair for holding cell phones, emergency call devices, computers, communication devices, remote controls, food, beverages, or other such items. Some individuals may use head controls, chin joysticks, and/or sip and puff systems to access and/or control their devices. The ease in access to these items often reduces the individual's reliance on their caregiver, providing them with greater independence. However, positioning of the devices can be critical, and in some cases, for example, may interfere with their ability to see where they are navigating their power wheelchair, forcing them to ask for help (which reduces their independence) or to drive with obscured vision.

Some existing positioning apparatuses lack the flexibility to be independently positioned or repositioned, and are typically designed for use with only a specific device. Some positioning apparatuses, for example, are designed to function in only a single or a few set positions, which may limit the use of the apparatus to only certain activities. For example, in many hospital and nursing home facilities where living space is often limited, the inability of the positioning apparatus to be set at different positions may prevent the unimpeded movement of a wheelchair through the living space, or may prevent a person from independently exiting a wheelchair or recliner with ease.

Additionally, the strength, dexterity, and range of motion requirements required to move or adjust many positioning apparatuses often limits their use to particular individuals. For individuals suffering from certain musculoskeletal disorders, for example, the strength required to adjust the device may be greater than the individuals' strength, preventing the adjustment of the device without the aid of a caregiver. In some designs, the mounting device may not be ergonomically suited for the individual. For those individuals requiring a wheelchair who rely upon an electronic speech generating device to communicate, for example, the inability to easily adjust or position the speech generating device may limit their ability to perform other essential functions, such as access food or drink, or sub-optimal device placement may cause the user increased fatigue over time, in some cases exacerbating the individual's condition. As such, there is an ongoing need for versatile positioning apparatuses to permit individuals to transport and reposition objects with minimal strength and dexterity.

BRIEF SUMMARY

An accessibility-enhancing joint module may include a housing, a powered motor disposed within the housing, a rotatable receiving member operatively connected to the powered motor, a coupling element configured to attach to the receiving member, and a control board disposed within the housing and operatively connected to the powered motor, wherein the coupling element is disposed external to the housing.

An accessibility-enhancing arm assembly may include a first joint module and a second joint module, each joint module including: a housing having a body portion and a proximal mounting portion, a powered motor disposed within the housing, and a rotatable receiving member operatively connected to the powered motor; and a tubular arm member matingly attached to the proximal mounting portion of the first joint module and the proximal mounting portion of the second joint module.

An accessibility-enhancing arm assembly may include a first joint module including: a housing having a body portion and a proximal mounting portion, a powered motor disposed within the housing, and a rotatable receiving member operatively connected to the powered motor; a tubular arm member matingly attached to the proximal mounting portion of the first joint module at a first end thereof; and an end cap having one or more connection ports disposed therein matingly attached to the tubular arm member at a second end thereof.

An accessibility-enhancing arm assembly may include a first joint module including: a housing having a body portion and a proximal mounting portion, a powered motor disposed within the housing, and a rotatable receiving member operatively connected to the powered motor; a first tubular arm member matingly attached to the proximal mounting portion of the first joint module; and a second tubular member spaced apart from the first tubular member, the second tubular member having an end cap including one or more connection ports disposed therein matingly attached to the second tubular arm member; wherein the end cap is operatively connected to the first joint module.

Figure 1:
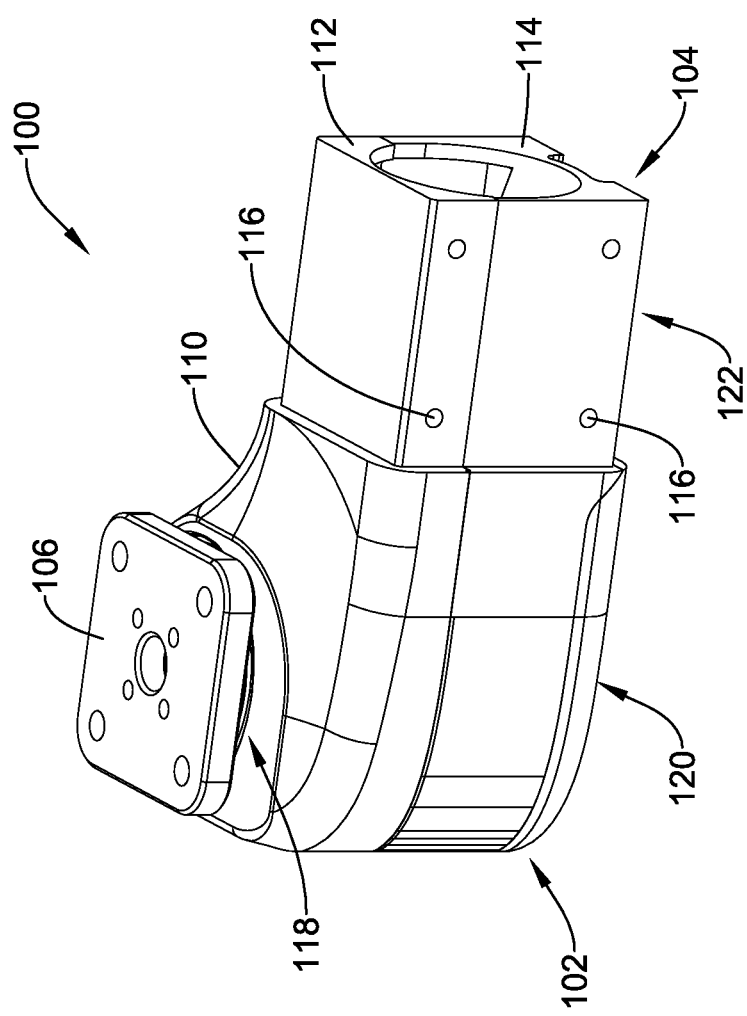
FIG. 1 is a top perspective view of an example joint module.

While the disclosure is amenable to various modifications and alternative forms, specifics thereof have been shown by way of example in the drawings and will be described in greater detail below. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The following description should be read with reference to the drawings, in which like elements in different drawings are numbered in like fashion. The drawings, which are not necessarily to scale, illustrate selected embodiments and are not intended to limit the claimed invention. Although examples of construction, dimensions, and materials are illustrated for the various elements, those skilled in the art will recognize that many of the examples provided have suitable alternatives that may be utilized. Different embodiments of the apparatus may combine or omit various elements from different drawings or embodiments as understood by one of skill in the art, without departing from the scope of the disclosure. For example, the example joint modules 100 and 1100 may generally be used interchangeably in the various drawings or embodiments described herein. While several illustrative embodiments are described herein with respect to wheelchairs, it should be understood that the apparatus could be used in conjunction with other types of devices. Examples of other devices can include, but are not limited to, walkers, beds, chairs, recliners, sofas, tables, walls, work stations, vehicles, and floor stands.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified.

Weight percent, percent by weight, wt %, wt-%, % by weight, and the like are synonyms that refer to the concentration of a substance as the weight of that substance divided by the weight of the composition and multiplied by 100.

The recitation of numerical ranges by endpoints includes all numbers and portions thereof within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangable with each other to form other additional embodiments or to complement and/or enrich the described embodiment(s), as would be understood by one of ordinary skill in the art.

FIG. 1 illustrates an accessibility-enhancing joint module 100. The joint module 100 may include a housing 110. In some embodiments, the housing 110 may include a top portion 112 and a bottom portion 114. In some embodiments, the top portion 112 may matingly align with the bottom portion 114. In some embodiments, the housing 110 may include a body portion 120 at and/or adjacent to a distal end 102 of the housing 110 and formed from a distal portion of the top portion 112 in combination with a distal portion of the bottom portion 114. In some embodiments, the housing 110 may include a proximal mounting portion 122 at and/or adjacent to a proximal end 104 of the housing 110 and formed from a proximal portion of the top portion 112 in combination with a proximal portion of the bottom portion 114. In some embodiments, the proximal mounting portion 122 may have a reduced, generally constant outer extent compared to the body portion 120, or in other words, an outer perimeter of the proximal mounting portion 122 may be less than an outer perimeter of the body portion 120. In some embodiments, the proximal mounting portion 122 may include a plurality of mounting holes 116 disposed therein.

In some embodiments, the housing 110 may be configured to receive a tubular arm member 200 about the proximal mounting portion 122, such as seen in FIGS. 6-16. The tubular arm member 200 may include a plurality of mounting holes 210 configured to align with the plurality of mounting holes 116. In some embodiments, a threaded fastener (not shown) may be removably inserted into each of the plurality of mounting holes 210 and the corresponding plurality of mounting holes 116. Other suitable attachment means both removable and non-removable, such as but not limited to, snap-fit, pins, rivets, welding, brazing, or soldering, are also contemplated. The tubular arm member 200 may vary in length and/or cross-section or shape. In general, the proximal mounting portion 122 and the tubular arm member 200 may cooperate to form a mating arrangement between them. In some embodiments, exact positioning of the plurality of mounting holes 116 may vary, for example, if the proximal mounting portion 122 has an alternate shape such as round or polygonal (i.e., triangular, hexagonal, octagonal, pentagonal, etc.), to facilitate attachment of the tubular arm member 200 at a desired orientation.

In some embodiments, the housing 110 may include a substantially hollow interior configured to hold and/or mount other elements of the joint module 100 as discussed herein. In some embodiments, the top portion 112 of the body portion 120 may include an aperture 118 through a top surface thereof for reasons that will become apparent.

Figure 2A:
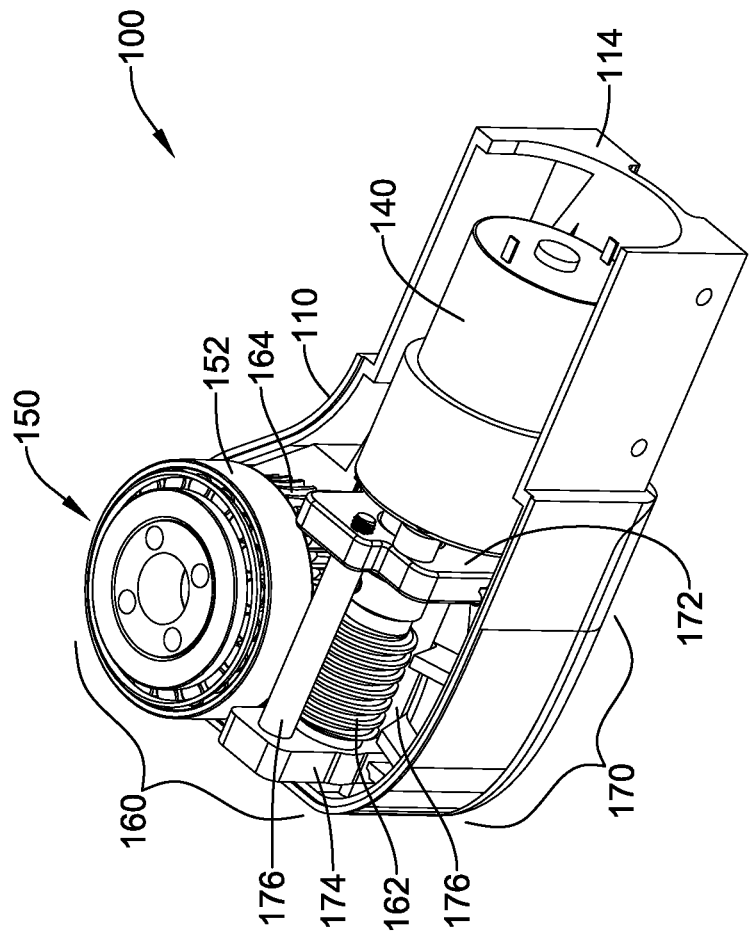
FIGS. 2A and 2B are top perspective, partial cut-away views showing the example joint module of FIG. 1.
Figure 2B:
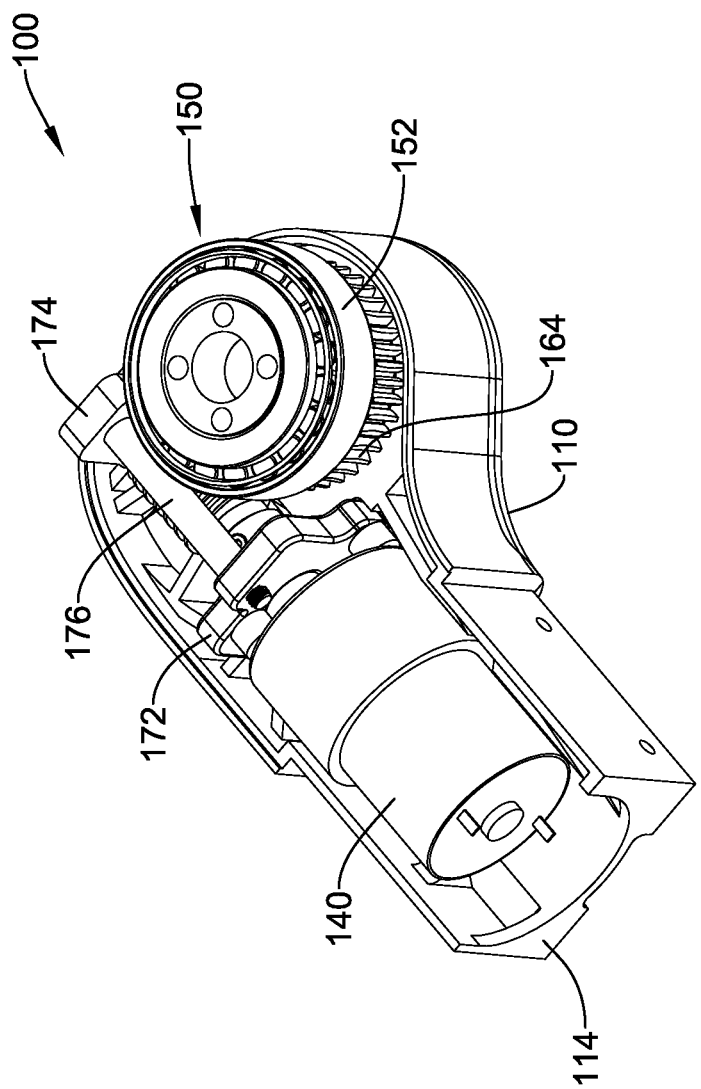

FIGS. 2A and 2B illustrate other elements of the joint module 100 held and/or mounted within a substantially hollow interior of the housing 110. In some embodiments, the joint module 100 may include a powered motor 140 disposed within the substantially hollow interior of the housing 110. In some embodiments, the powered motor 140 may be oriented generally longitudinally with an output at a distal end thereof.

The joint module 100 may include a rotatable receiving member 150 operatively connected to the powered motor 140. In some embodiments, the powered motor 140 may be configured to provide relatively high-torque, low-speed rotational drive or movement to the receiving member 150. In some embodiments, the receiving member 150 may be oriented generally perpendicular to the powered motor 140. In some embodiments, the receiving member 150 may be axially aligned with the aperture 118. In some embodiments, the receiving member 150 may extend through the aperture 118. In some embodiments, the receiving member 150 may include one or more bearing members 152 configured to facilitate load handling and/or alignment during rotational movement of the receiving member 150. The one or more bearing members 152 may be of any suitable type (i.e., ball bearings, roller bearings, etc.) as understood by one of ordinary skill in the art.

The joint module 100 may include a coupling element 106 configured to attach to the receiving member 150. In some embodiments, the receiving member 150 may be configured to hold the coupling element 106 in a fixed position relative to the receiving member 150. In some embodiments, the coupling element 106 may be removably attached to the receiving member 150. In some embodiments, the coupling element 106 may be attached to the receiving member 150 by a plurality of fasteners 158. In some embodiments, the coupling element 106 may be attached to the receiving member by other means such as, but not limited to, a keyed shaft, a set screw, a frangible bond or weld, a combination of these, or other suitable means. In some embodiments, the coupling element 106 is disposed external to the housing 110.

In some embodiments, the powered motor 140 may be operatively connected to the receiving member 150 by a gear set 160. In some embodiments, the powered motor 140 and the gear set 160 may be configured to permit continuous 360 degree rotation of the receiving member 150 in a clockwise direction, a counterclockwise direction, or both. Generally, the receiving member 150 may be configured to rotate in only a single plane. In other words, the receiving member 150 may be configured to rotate about its central axis, wherein the central axis of the receiving member 150 remains fixed within a single plane. However, other configurations are possible.

In some embodiments, the gear set 160 may include a worm 162 and a worm wheel 164. Other gear types and/or combinations suitable for use herein are also contemplated. In some embodiments, the worm 162 may be mounted within a worm cage assembly 170. An illustrative worm cage assembly 170 may include a motor mounting plate 172, a secondary plate 174, and a plurality of spacers and/or fastening bolts 176. The motor mounting plate 172 and/or the secondary plate 174 may each include a hole or aperture disposed therein which rotatably receives an end of the worm 162. As shown in FIGS. 2A and 2B, a proximal end of the worm 162 may be received within the motor mounting plate 172 and a distal end of the worm 162 may be received within the secondary plate 174. However, other arrangements may be possible. In some embodiments, a distal end of the powered motor 140 may be fixedly attached to the motor mounting plate 172. In some embodiments, the motor mounting plate 172 and/or the secondary plate 174 may be captured or otherwise positioned within the hollow interior of the housing 110 at or within the body portion 120.

In some embodiments, an output of the powered motor 140 may rotate about a first axis and the worm 162 may rotate about an axis that is oriented generally parallel to the first axis. In some embodiments, the worm 162 may be axially aligned with an output of the powered motor 140. In some embodiments, the output of the powered motor 140 and the worm 162 may both rotate about the first axis. In some embodiments, an output of the powered motor 140 may rotate about a first axis, the receiving member 150 may rotate about a second axis spaced apart from the first axis, and the first axis may be oriented at about 90 degrees relative to the second axis. In some embodiments, the worm 162 may rotate about an axis oriented substantially perpendicular to the second axis.

In some embodiments, the joint module 100 may include one or more means for providing electrical power to the powered motor 140 from a source external to the joint module 100. In some embodiments, the means for providing electrical power may include a direct connection, such as by wire(s), electromagnetic induction elements, and/or other wireless transfer of energy, as well as combinations of these or suitable alternatives. For example, a joint module 100 may include electromagnetic induction elements directly connected to the powered motor 140 by one or more wires. In some embodiments, a slip ring (not visible) may be positioned within the receiving member 150 to permit energy transfer between the joint module 100 and an adjacent tubular arm member 200 or other element as appropriate, and the slip ring may be operatively connected to the powered motor 140 by one or more wires (not shown). In some embodiments, the slip ring may include and/or be connected to one or more wires configured to transfer electrical power, data, or other necessary or desired signals between the joint module 100 and an adjacent tubular arm member 200 or other element. In some embodiments, an end cap 510 (as described herein) may be operatively connected to and/or in communication with the slip ring and/or the one or more wires connected to the slip ring to facilitate power and/or data transfer into, from, and/or through the joint module 100 and/or an arm assembly. In some embodiments, the end cap 510 may be hard-wired or physically connected to the slip ring and/or the one or more wires connected to the slip ring.

Figure 3:
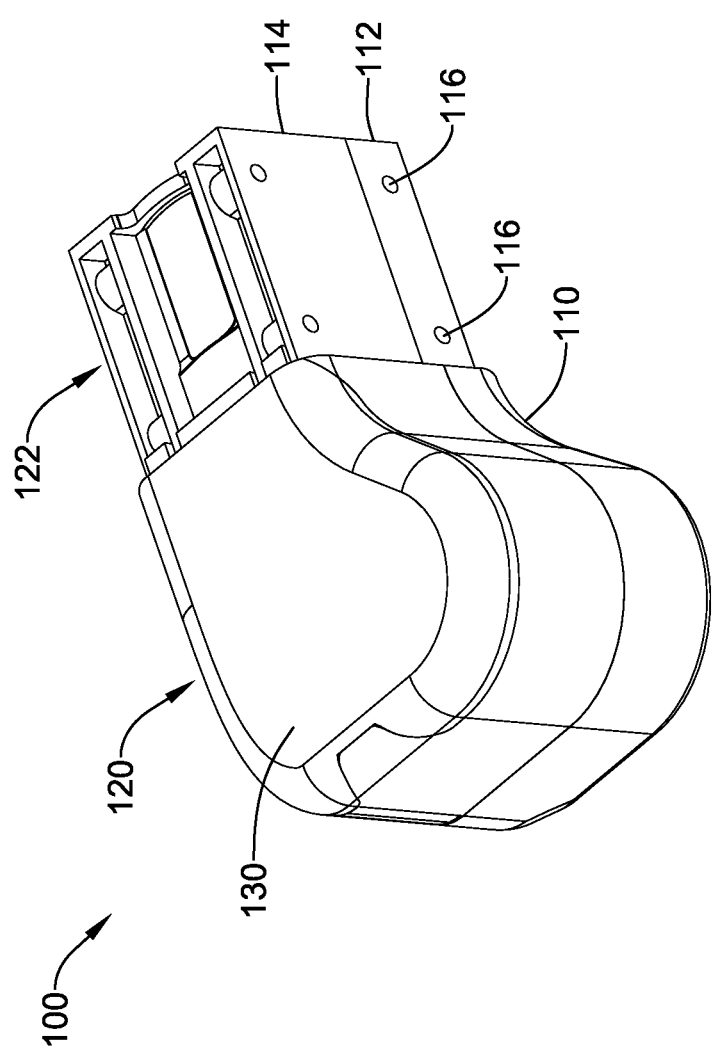
FIG. 3 is a bottom perspective view of the example joint module of FIG. 1.
Figure 4:
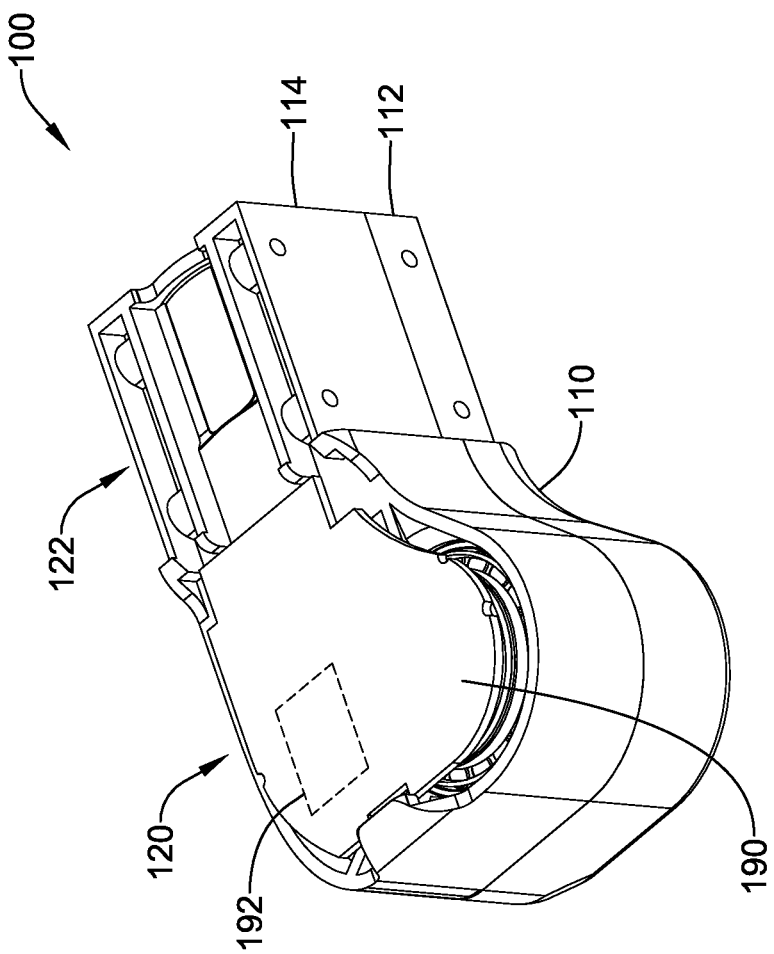
FIGS. 4 and 5 are bottom perspective, partial cut-away views of the example joint module of FIG. 1.
Figure 5:
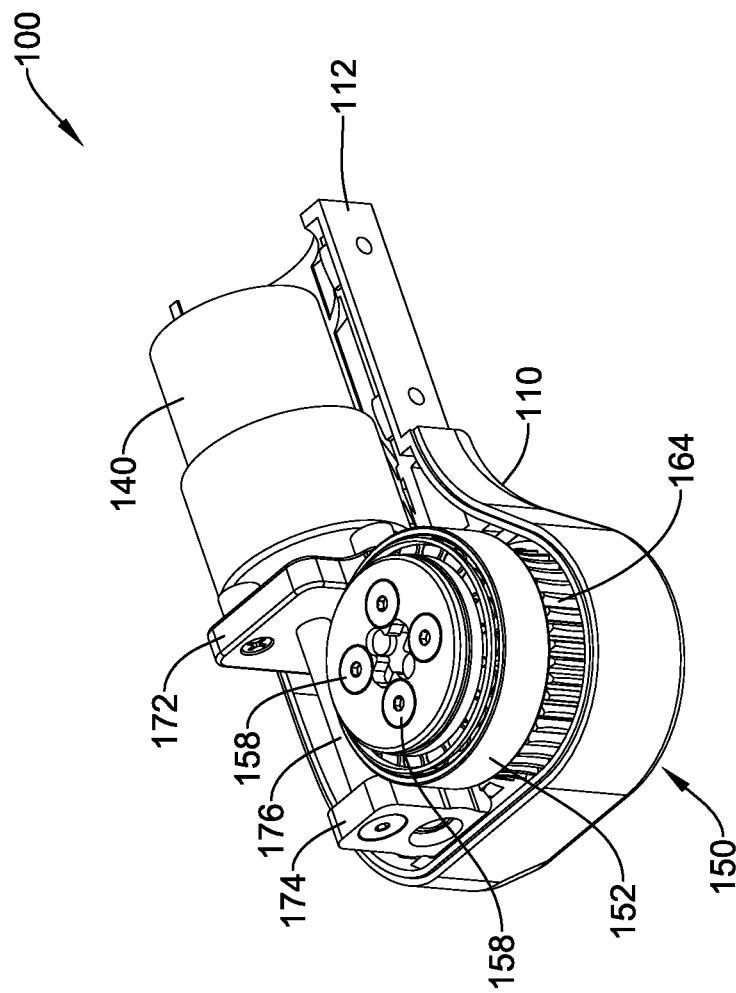

In some embodiments, the housing 110 may include a removable bottom cover 130, as seen in FIG. 3. In some embodiments, the removable bottom cover 130 may be formed of or made from a suitable polymeric or plastic material. In some embodiments, the bottom cover 130 may be configured to be removed from the housing 110 in order to access certain elements disposed within the hollow interior of the housing 110. In some embodiments, the joint module 100 may include a control board 190 disposed within the housing 110. In some embodiments, the control board 190 may be operatively connected to the powered motor 140 to permit transfer of energy, commands, feedback, and/or other information or data therebetween. In some embodiments, the control board 190 may be end-user programmable with one or more fixed rotational positions, or "sweet spots", of the receiving member 150. In some embodiments, the control board 190 may include a position sensor, such as a hall effect sensor, configured to determine the rotational position of the receiving member 150.

In some embodiments, the joint module 100 may include a radio receiver and/or transceiver 192 operatively connected to the control board 190. In some embodiments, the radio receiver and/or transceiver 192 may be disposed on the control board 190. In some embodiments, the radio receiver and/or transceiver 192 may be disposed separately (i.e., spaced apart from) the control board 190 within the housing 110. In some embodiments, the radio receiver and/or transceiver 192 may be configured to receive control signals wirelessly. In some embodiments, the radio receiver and/or transceiver 192 may be configured to receive and/or send status updates, position information, error codes or messages, or other desired feedback or information. The radio receiver and/or transceiver 192 may send and/or receive via a suitable wireless signal such as, but not limited to, Bluetooth, Wi-Fi, VHF, UHF, VLF, infrared, cellular, and the like. In some embodiments, the radio receiver and/or transceiver 192 may include a discrete, remotely-mounted antenna (not shown) which may improve reception and/or transmission of wirelessly transmitted instructions, controls, data, or other appropriate information. In some embodiments, a polymeric or plastic bottom cover 130 may facilitate and/or enhance wireless transmission and/or reception by the radio receiver and/or transceiver 192.

Figure 6:
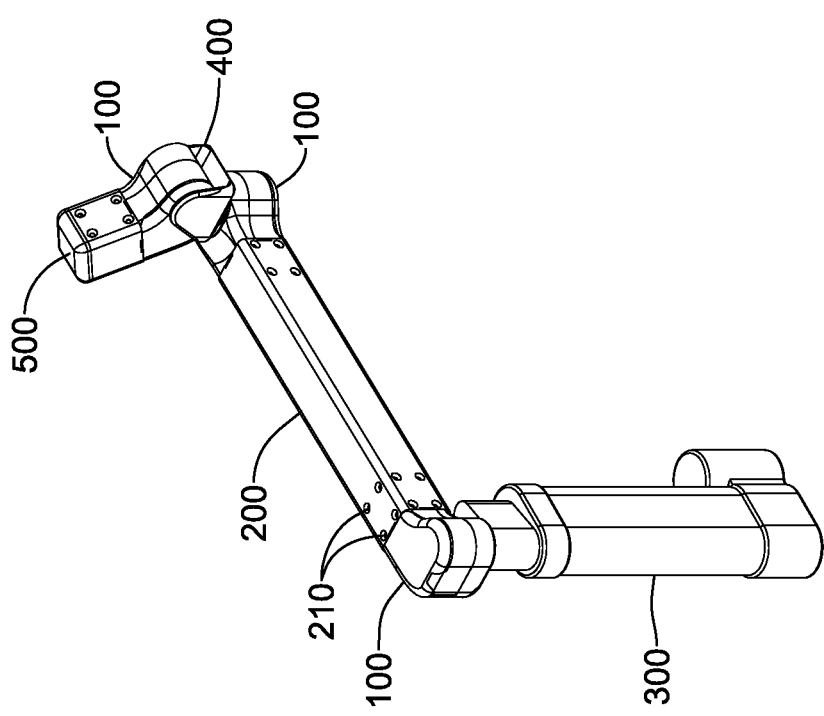
FIGS. 6-11 illustrate example embodiments of an assembly incorporating an example joint module.

In use, the joint module 100 generally provides rotational movement in a single plane. It is contemplated to use a plurality of joint modules 100 to provide movement in multiple planes or directions. As mentioned above, the example joint module 100 (described above) and the example joint module 1100 (described below) may be used interchangeably with each other, intermixed with each other, or in other suitable configurations as understood by one of skill in the art, particularly with respect to the various arm assemblies described herein. For example, FIG. 6 shows an illustrative accessibility-enhancing arm assembly, which may include a vertical member 300, a first joint module 100 mounted thereto, a tubular arm member 200 having a first end matingly received over a proximal mounting portion 122 of the first joint module 100, a second joint module 100 having a proximal mounting portion 122 matingly inserted into a second end of the tubular arm member 200, a joint bracket 400 mounted to the second joint module 100, and a third joint module 100 attached to the joint bracket 400. In some embodiments, a joint bracket 400 may be formed as a U-bracket having a U-shape. In some embodiments, a joint bracket 400 may be formed as an L-bracket having an L-shape. Other configurations are also contemplated. In some embodiments, an end cap 500 may be provided on or within an open end of a joint module 100 or a tubular arm member 200. In some embodiments, the end cap 500 may be an end plug devoid of connectors therein or connections therethrough (e.g., data, power, etc.). In some embodiments, the example joint module 1100 (described below) may be used in place of one or more of the example joint modules 100. Throughout the disclosure herein, the joint module 100 and the joint module 1100 may be considered interchangeable, with one being readily and easily replaced by the other within the context of the disclosure by the skilled artisan. Similarly, throughout the disclosure herein, the end cap 500 and the end cap 510 (described below) may be considered interchangeable, with one being readily and easily replaced by the other within the context of the disclosure by the skilled artisan. In general, where physical connection features are not needed or desired, the end cap 500 may be used to block off access to the open end of a joint module 100 or tubular member 200. As readily understood by one of ordinary skill in the art, some elements may be omitted or duplicated without deviating from the spirit and intent of the accessibility-enhancing arm assembly disclosed herein.

Figure 7:
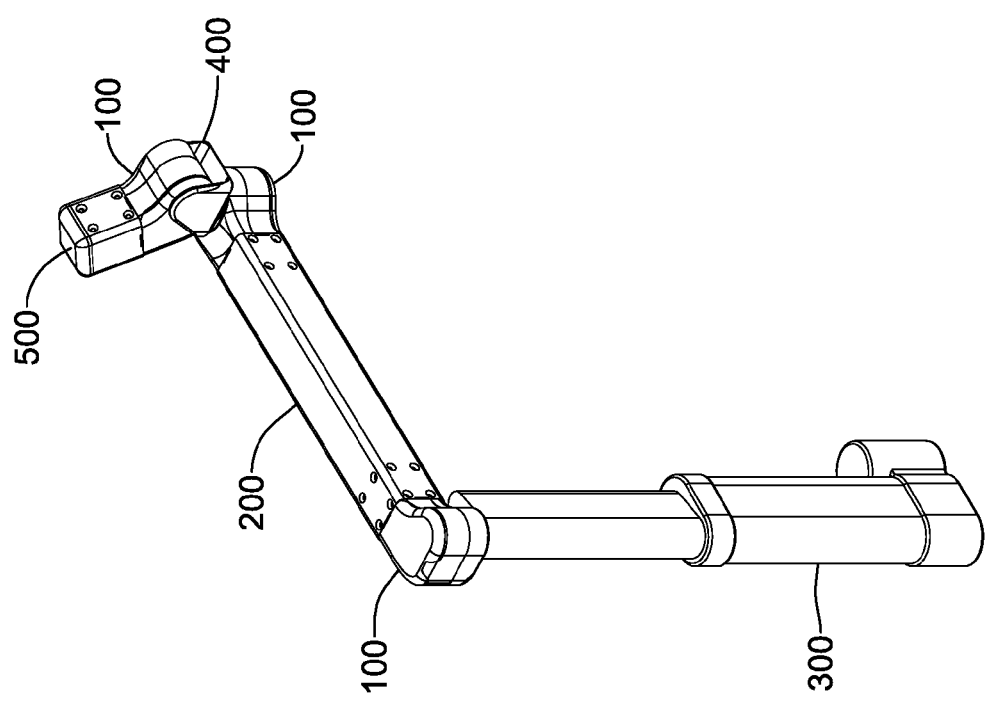
Figure 8:
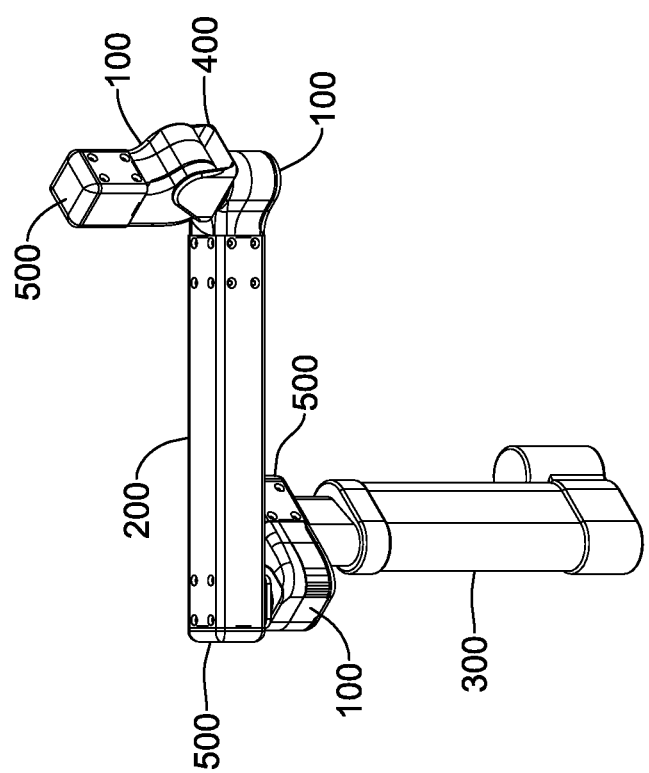
Figure 9:
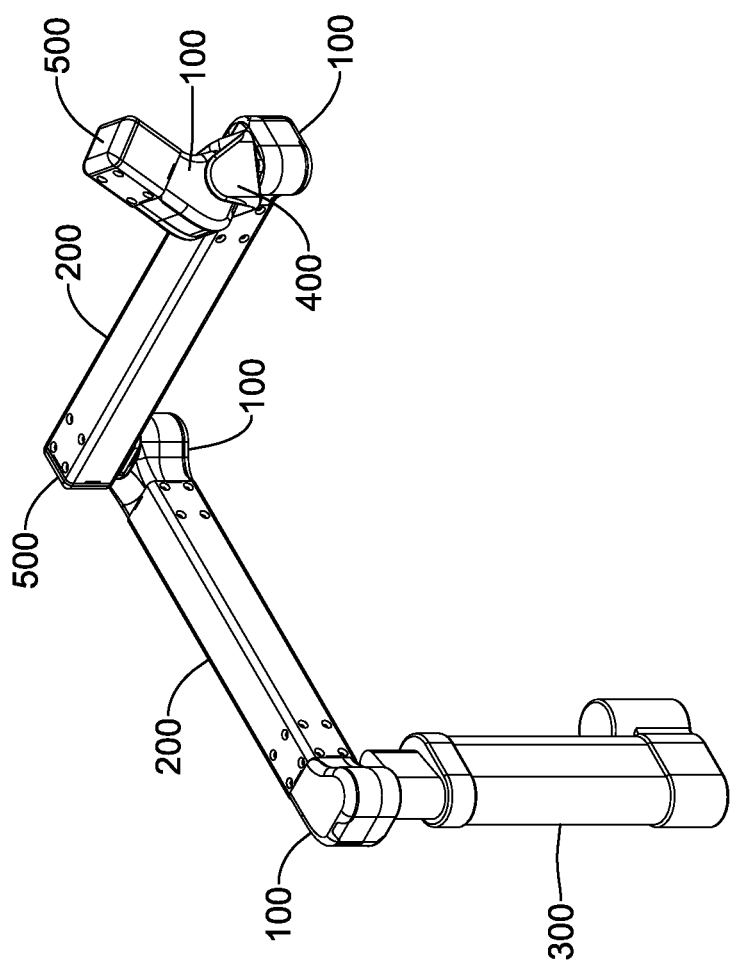
Figure 10:
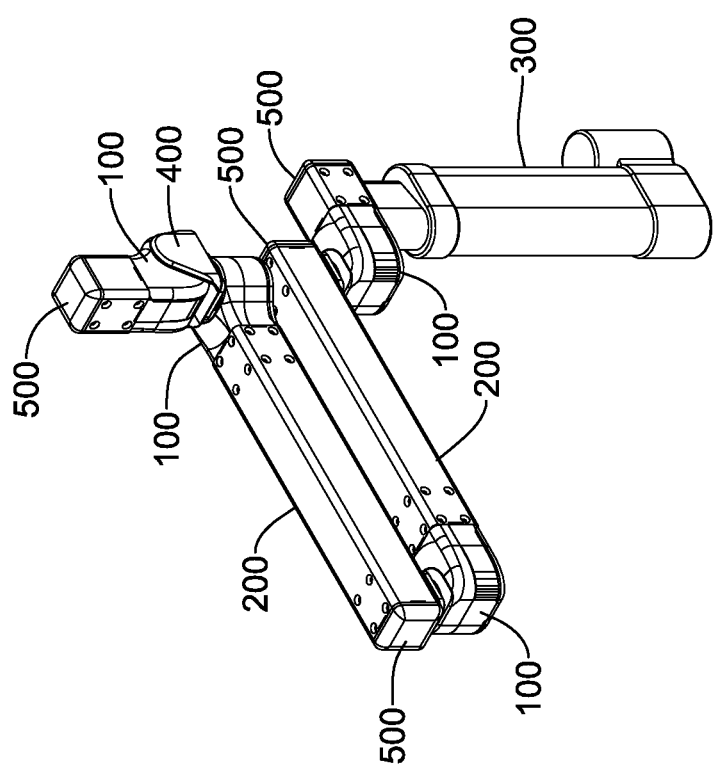
Figure 11:
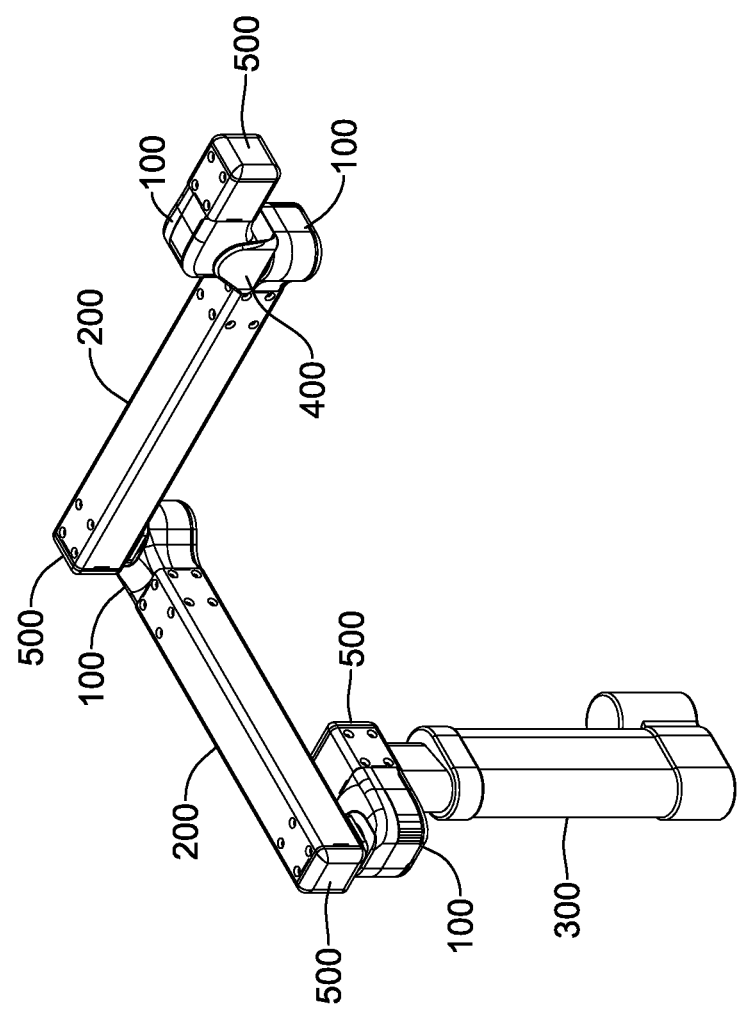

The vertical member 300 may be mounted to a wheelchair, walker, bed, chair, recliner, sofa, table, wall, work station, vehicle, floor stand, etc. as appropriate to enhance a user's accessibility. A powered, height-adjustable vertical member 300 may be configured to be infinitely adjustable from a lowered position, such as shown in FIG. 6, to a raised position, such as shown in FIG. 7. Alternatively, the vertical member 300 may be configured to be incrementally adjustable by predetermined amounts, segments, positions, etc., if desired. The vertical member 300 may be adjusted by electrical, hydraulic, pneumatic, mechanical, or other suitable means. In some embodiments, the vertical member 300 may have a fixed height, or be non-adjustable. In some embodiments, the vertical member 300 may be manually adjustable. Additionally, while the vertical member 300 may be shown in some of the illustrative examples, the vertical member 300 is not a required element and may be omitted or positioned differently within the accessibility-enhancing arm assembly, if desired.

In general, it is desirable for an accessibility-enhancing arm assembly to be resistant to intrusion by weather, dust, insects, and the like. As would be understood by one of ordinary skill in the art, sealing elements (not shown) such as gaskets, o-rings, etc. may be provided to enhance resistance to intrusion by undesirable elements.

As illustrated in FIGS. 8-11, an accessibility-enhancing arm assembly may be modular in nature and may be assembled in a variety of configurations. The exact quantity and/or orientation of a joint module 100 and/or a tubular arm member 200 may be modified or changed as necessary to construct an accessibility-enhancing arm assembly for a particular use, need, or situation. For example, a tubular arm member 200 may vary in length or orientation. A tubular arm member 200 may be provided with a plurality of mounting holes 210 that permit a single orientation, or a tubular arm member 200 may be provided with a plurality of mounting holes 210 that permit multiple orientations. In some embodiments, additional joint module(s) 100 and/or tubular arm member(s) 200 may provide additional degrees of freedom of movement to the accessibility-enhancing arm assembly. In some embodiments, one or more joint modules 100 may be disabled, locked, or otherwise fixed in position, if so desired.

In some embodiments, a joint module 100 may be oriented to provide horizontal movement, vertical movement, or a tilting capability. In some embodiments, the tubular arm member 200 may orient the first joint module 100 relative to the second joint module 100 such that the rotatable receiving member 150 of the first joint module 100 is oriented substantially parallel to the rotatable receiving member 150 of the second joint module 100. In some embodiments, the tubular arm member 200 may orient the first joint module 100 relative to the second joint module 100 such that the rotatable receiving member 150 of the first joint module 100 is oriented substantially perpendicular to the rotatable receiving member 150 of the second joint module 100. In some embodiments, each joint module 100 may be configured to matingly attach to the tubular arm member 200 at a plurality of orthogonal orientations. Other angles and orientations are also contemplated, particularly in embodiments where the tubular arm member 200 is formed with an alternative, non-square shape.

In some embodiments, the accessibility-enhancing arm assembly may include a second tubular arm member 200 operatively connected to the second joint module 100. In some embodiments, the second joint module 100 may be configured to rotate or pivot the second tubular arm member 200 relative to the first tubular arm member 200. In some embodiments, the second tubular arm member 200 may be matingly attached to the third joint module 100 at a first end and operatively connected to the second joint module at a second end. In some embodiments, a coupling element 106 may be configured to attach to the rotatable receiving member 150 of the second joint module 100 or the third joint module 100, depending on the configuration of the accessibility-enhancing arm assembly, and the coupling element 106 may be configured to attach a personal-use device, or a means 600 of attaching a device (e.g., a personal-use device), thereto.

Figure 12:
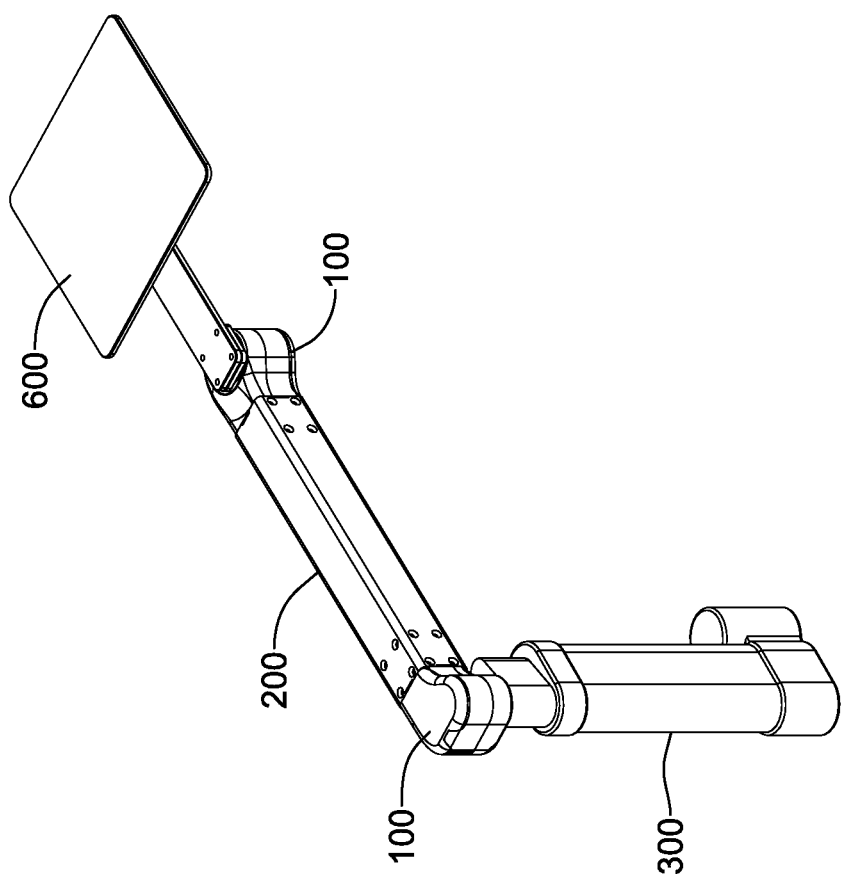
FIGS. 12-16 illustrate example embodiments of an assembly incorporating an example joint module and an illustrative means of attaching a personal-use device.
Figure 13:
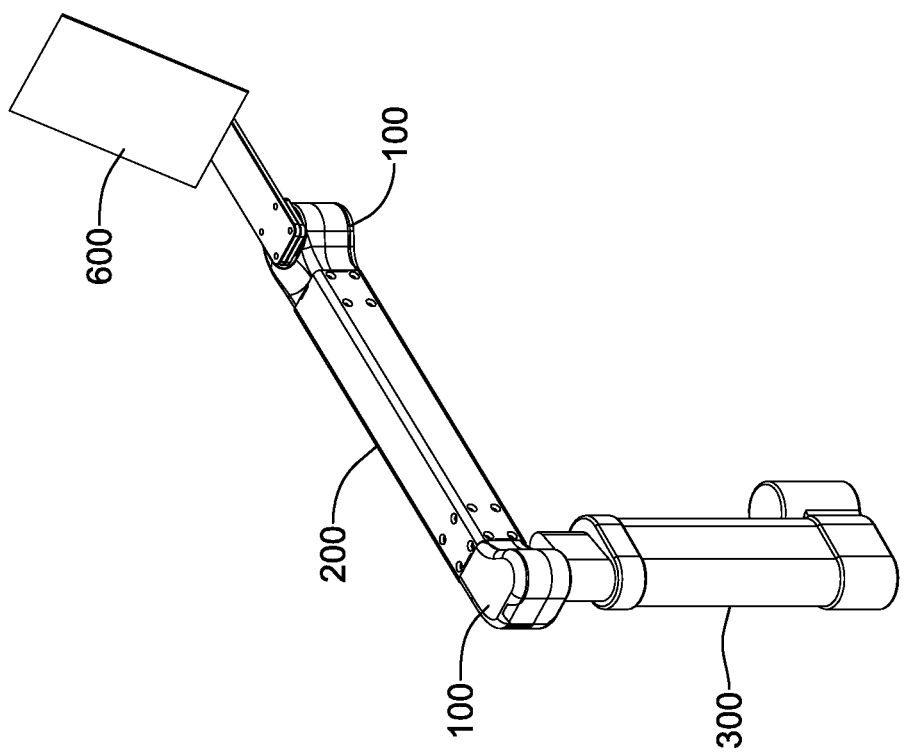
Figure 14:
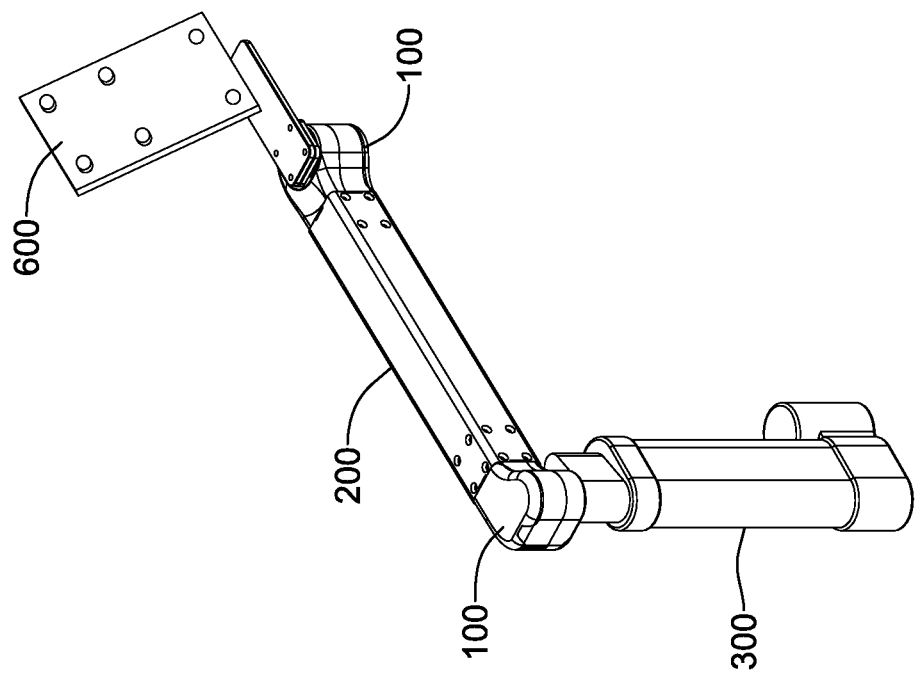

FIGS. 12-14 show several illustrative means 600 of attaching a device, the exact form of which may be varied or tailored for a particular use or application, allowing an individual to hold cell phones, emergency call devices, computers, electronic speech generating devices, remote controls, food, beverages, or other such items within reach, such as (but not limited to) within arm's reach, within reach of a user's mouth (e.g., to sip from a straw or utilize a puff-based control), within reach of a mouthstick (i.e., to access a tablet, to paint, etc.), or within reach of other suitable access means. In some embodiments, a means 600 of attaching a device may include a quick release plate, a clamping mechanism, a dedicated device holder, a hook and loop fastener, a rotatable mechanical fastener or fastening mechanism (i.e., screw, bolt, cam, etc.), or other suitable means of attaching or holding a device. For example, in some embodiments, a means 600 of attaching a device may be provided which serves as a lazy-susan (not shown) configured to attach a plurality of personal-use devices thereto, and a joint module 100 may rotate the means 600 of attaching a device so as to change which personal-use device is positioned in front of the user. While not expressly illustrated, in some embodiments, a plurality of means 600 of attaching a device may be attached to a single joint module 100 to serve as a lazy-susan configured to attach a plurality of personal-use devices thereto, wherein the joint module 100 may rotate the plurality of means 600 of attaching a device so as to change which personal-use device is positioned in front of the user. As discussed above, the control board 190 may be end-user programmable with one or more fixed rotational positions, or "sweet spots", of the receiving member 150, thereby allowing the user to customize the positioning of the means 600 of attaching a device.

Figure 15:
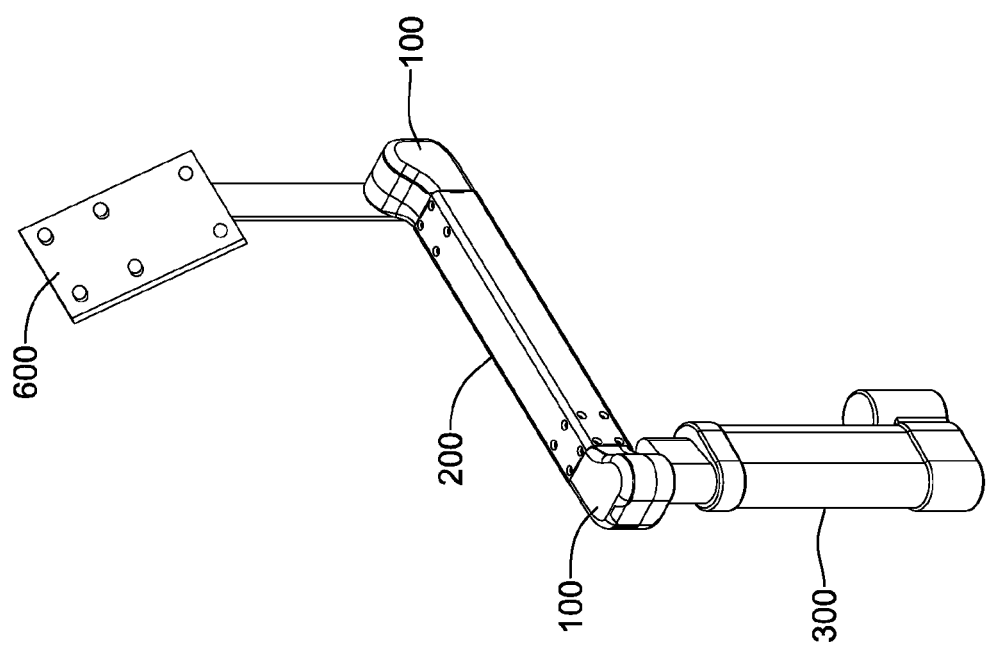
Figure 16:
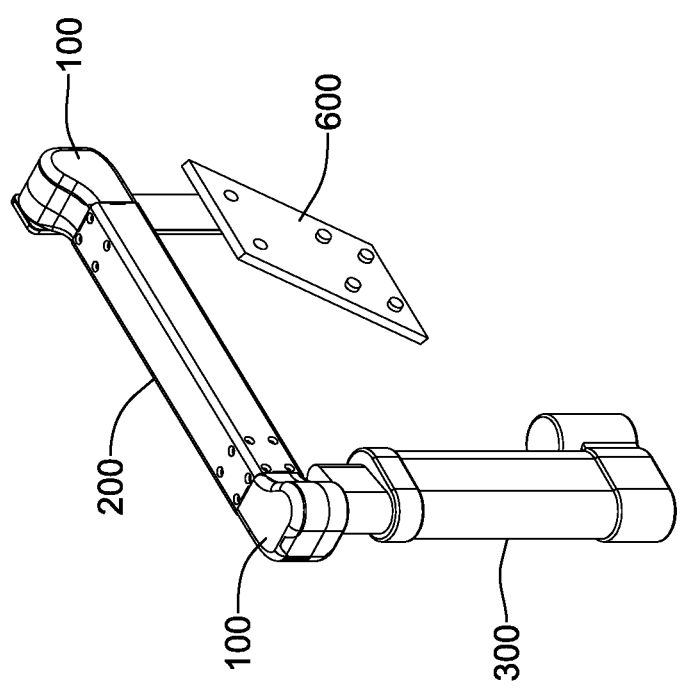

In some embodiments, the receiving member 150 of a second joint module 100 may be oriented substantially perpendicular to the receiving member 150 of a first joint module 100, such as seen in FIGS. 15-16 for example, and actuation of one (as illustrated, the second or distal) joint module 100 may rotate an example means 600 of attaching a device down and out of the field of view of the user for driving or other visibility, or for other reasons. FIG. 15 illustrates an example means 600 of attaching a device operatively connected to a joint module 100 in a first, substantially up or "zero-degree" position, and FIG. 16 illustrates an example means 600 of attaching a device operatively connected to a joint module 100 in a second, substantially down or "180-degree" position. Other positions therebetween are also contemplated such as, but not limited to, a 30-degree position, a 45-degree position, a 60-degree position, a 90-degree position, a 120-degree position, a 135-degree position, a 150-degree position, etc. In some embodiments, the joint module 100/1100 may be actuated rotationally to provide a tilt function or adjustment for the means 600 of attaching a device. In some embodiments, a joint module 100/1100 configured as a tilt mechanism, such as in FIGS. 6-11 and 17-18 for example, may permit a wheelchair-bound user to adjust the incline angle of the means 600 of attaching a device and/or a personal-use device attached thereto down out of their field of view for enhanced visibility while driving/operating the wheelchair. Alternatively, in some embodiments, the receiving member 150 of the second joint module 100 may be oriented substantially parallel to the receiving member 150 of the first joint module 100, such as seen in FIGS. 12-14 for example, and actuation of one (as illustrated, the second or distal) joint module 100 may rotate the means 600 of attaching a device to the side and out of the field of view of the user for driving or other visibility, to permit a person to more easily exit a wheelchair, or for other reasons.

In some embodiments, components of the joint module 100 and/or the arm assembly may prevent relative rotational movement of the receiving member 150 and/or a means 600 of attaching a device caused by application of an external force (e.g., the effect of gravity upon a device being held or by movement resulting from an individual applying force thereto, such as depressing buttons on a cell phone or a speech generating device). In some embodiments, the worm 162 and the worm wheel 164 may be oriented at an angle relative to each other such that relative rotation and/or movement is prevented. In other words, the worm 162 and the worm wheel 164 engage in a way that prevents manual (i.e., non-powered and/or external) movement (i.e. overdrive) of the joint module and/or the arm assembly by an applied external force. In some embodiments, the worm 162 may have an involute profile. In some embodiments, the worm wheel 164 may include a curved profile configured to cup the worm 162 when the worm 162 and the worm wheel 164 are engaged. In some embodiments, the powered motor 140 and the control board 190 may be configured to prevent rotational movement of the receiving member 150 and/or a means 600 of attaching a device caused by the weight of a device being held or by movement resulting from an individual applying force thereto, such as depressing buttons on a cell phone or a speech generating device. In some embodiments, the worm 162 and the worm wheel 164 may engage in a way that prevents manual (i.e., non-powered and/or external) movement (i.e. overdrive) of the joint module and/or the arm assembly by an applied external force, even in a non-powered state.

The various elements of the disclosure (i.e., the housing 110/1110, the tubular arm member 200, the joint bracket 400, the end cap 500/510, the means 600, etc.) may be made from aluminum, zinc, magnesium, titanium, or other suitable metallic materials and/or alloys thereof. Preference is shown for lightweight, high-strength materials, although any suitable material may be utilized. In some embodiments, certain polymers and/or composite materials may also be suitable for use in the disclosure. Manufacturing of the elements may be any suitable method or means, including but not limited to casting (e.g., die casting, investment casting, etc.), machining, extrusion, stamping, molding, and/or mechanical assembly, and the like.

Figure 18:
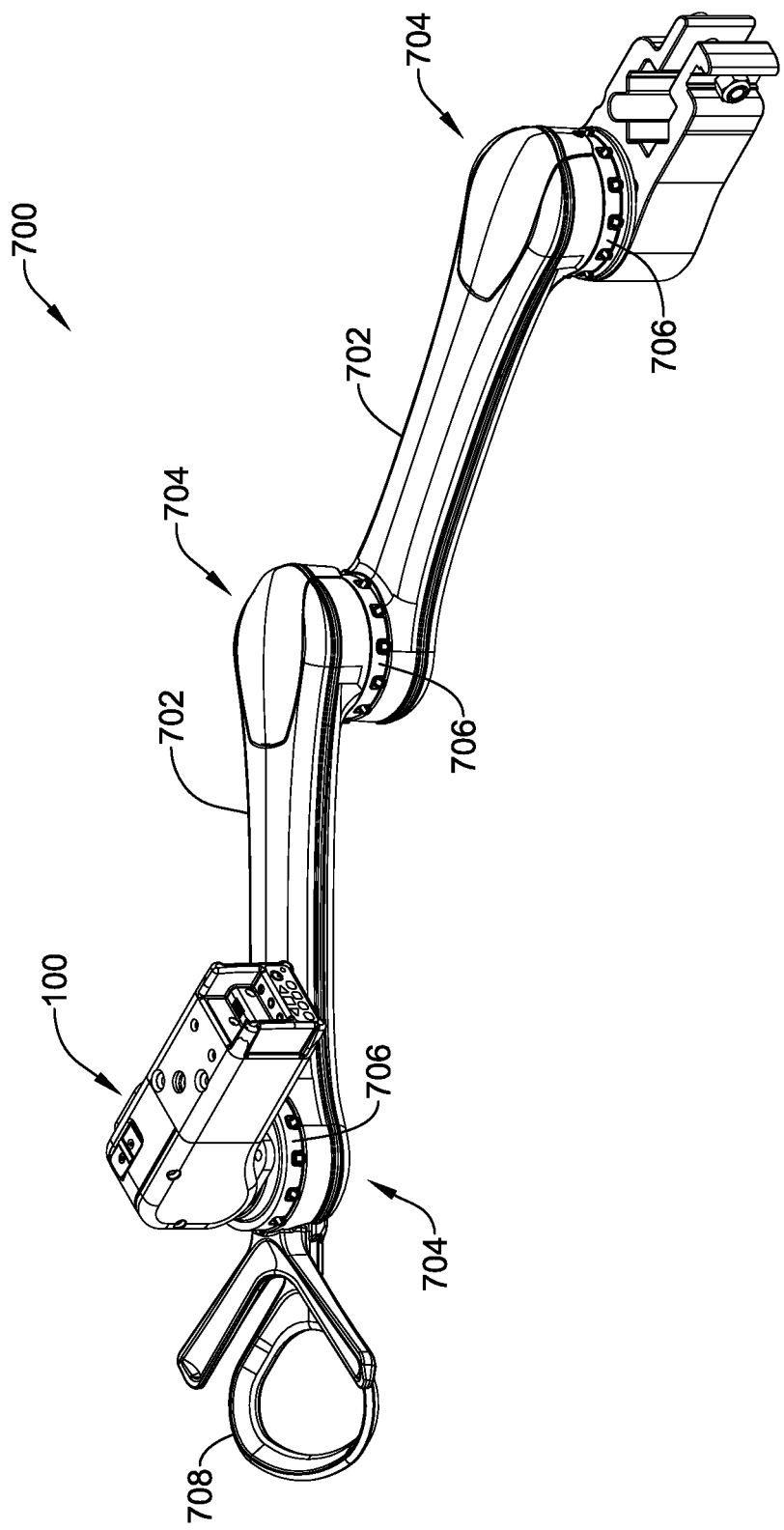
FIG. 18 illustrates an example joint module mounted to an example positioning apparatus.

FIG. 18 illustrates an example joint module 1100 mounted to an example positioning apparatus 700 in a tilting configuration. As discussed above, the example joint module 100 may be used in place of, or along with, one or more of the example joint modules 1100. In some embodiments, the joint module 1100 may be mounted to the positioning apparatus 700 in a horizontal rotating configuration, or other suitable configuration. In some embodiments, the positioning apparatus may include one or more arms 702 connected to at least one joint 704. In some embodiments, the positioning apparatus 700 may include a locking mechanism 706 configured to prohibit relative movement between the one or more arms 702 and the at least one joint 704. In some embodiments, the positioning apparatus 700 may include a manual actuation lever 708 disposed at a distal end, the actuation lever 708 configured to release the locking mechanism 706, thereby permitting relative movement between the one or more arms 702 and the at least one joint 704.

Figure 19:
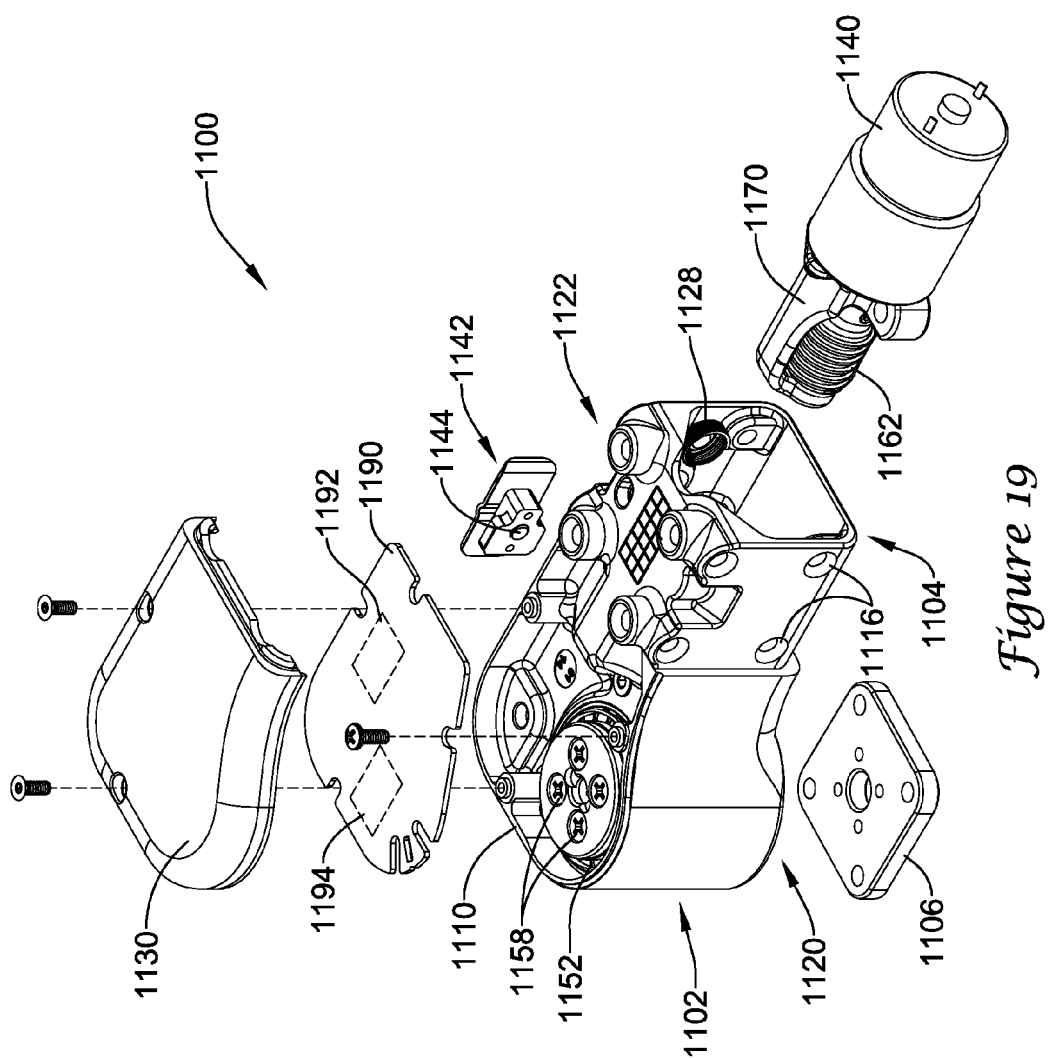
FIG. 19 is a bottom perspective, partially exploded view of an example joint module.
Figure 20:
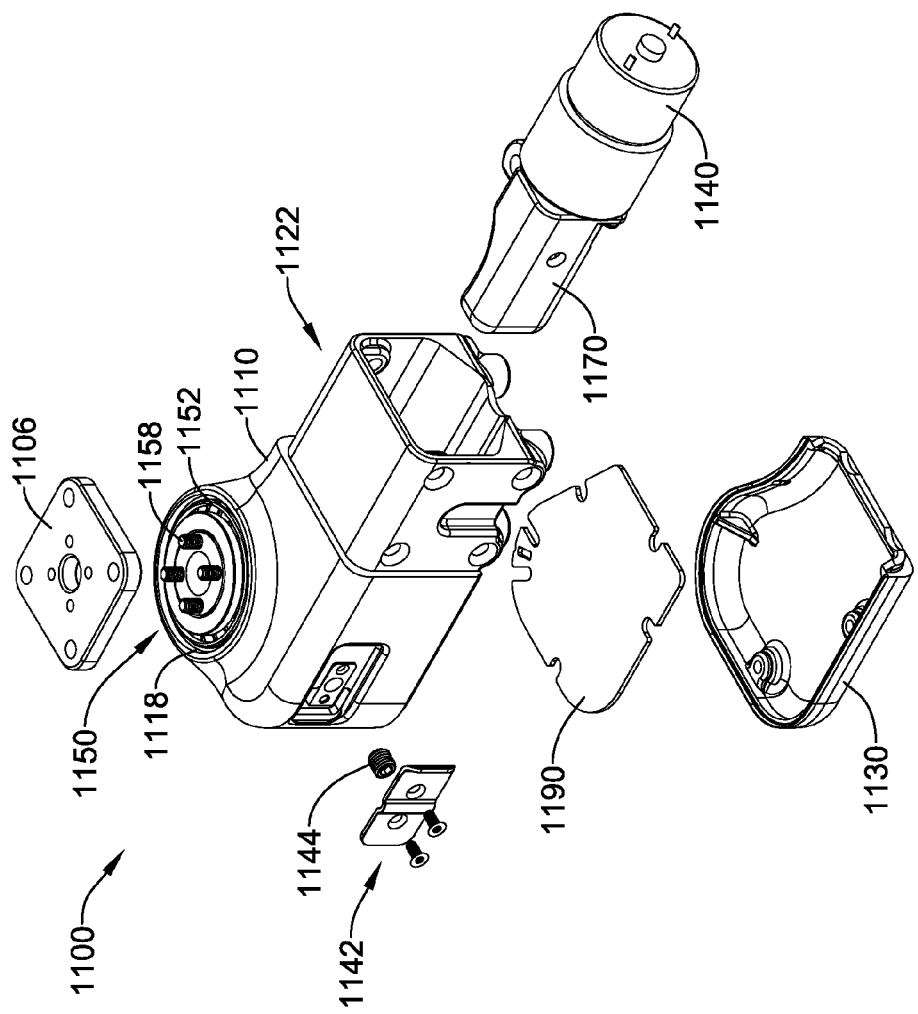
FIG. 20 is a top perspective, partially exploded view of the example joint module of FIG. 19.

FIGS. 19 and 20 illustrate an example joint module 1100 in a partially exploded view. In some embodiments, a joint module 1100 may include a unibody housing 1110. In other words, in some embodiments, the housing 1110 may comprise a single piece or unitary structure. In some embodiments, the housing 1110 may include a body portion 1120 at and/or adjacent to a distal end 1102 of the housing 1110, and a proximal mounting portion 1122 at and/or adjacent to a proximal end 1104 of the housing 1110. In some embodiments, the proximal mounting portion 1122 may have a reduced, and in some cases generally constant, outer extent compared to the body portion 1120. In other words, in some embodiments, an outer perimeter of the proximal mounting portion 1122 may be less than an outer perimeter of the body portion 1120. In some embodiments, the proximal mounting portion 1122 may include a plurality of mounting holes 1116 disposed therein. In some embodiments, the proximal mounting portion 1122 may include a recessed portion disposed between at least some of the plurality of mounting holes 1116, the recessed portion being configured to receive flexible elements therein such as electrical wiring, data cabling, etc.

In some embodiments, the housing 1110 may be configured to slidably receive a tubular arm member 200 about the proximal mounting portion 1122, such as shown in FIGS. 6-18 and 24 for example. The tubular arm member 200 may include a plurality of mounting holes 210 configured to align with the plurality of mounting holes 1116 of the proximal mounting portion 1122 of the housing 1110. In some embodiments, the plurality of mounting holes 210 may include 2 mounting holes, 3 mounting holes, 4 mounting holes, or 5 or more mounting holes, as desired. In some embodiments, a threaded fastener (not shown) may be removably inserted into each of the plurality of mounting holes 210 of the tubular arm member 200 and the corresponding plurality of mounting holes 1116 of the proximal mounting portion 1122. Other suitable attachment means both removable and non-removable, such as but not limited to, snap-fit, pins, rivets, welding, brazing, or soldering, are also contemplated. The tubular arm member 200 may vary in length and/or cross-section or shape. In general, the proximal mounting portion 1122 and the tubular arm member 200 may cooperate to form a mating arrangement between them. In some embodiments, exact positioning of the plurality of mounting holes 1116 of the proximal mounting portion 1122 may vary, for example, if the proximal mounting portion 1122 has an alternate shape such as round or polygonal (i.e., triangular, hexagonal, octagonal, pentagonal, etc.), to facilitate attachment of the tubular arm member 200 at a desired orientation.

In some embodiments, the housing 1110 may include a substantially hollow interior configured to hold and/or mount other elements of the joint module 1100 as discussed herein. In some embodiments, the body portion 1120 may include an aperture 1118 through a top surface thereof at or near the distal end 1102, for reasons that will become apparent.

FIGS. 19 and 20 illustrate other elements of the joint module 1100 held and/or mounted within a substantially hollow interior of the housing 1110. In some embodiments, the joint module 1100 may include a powered motor 1140 disposed within the substantially hollow interior of the housing 1110. In some embodiments, the powered motor 1140 may be oriented generally longitudinally with an output at a distal end thereof.

The joint module 1100 may include a rotatable receiving member 1150 operatively connected to the powered motor 1140. In some embodiments, the powered motor 1140 may be configured to provide relatively high-torque, low-speed rotational drive or movement to the receiving member 1150. In some embodiments, the receiving member 1150 may be oriented generally perpendicular to the powered motor 1140. In some embodiments, the receiving member 1150 may be axially aligned with the aperture 1118. In some embodiments, the receiving member 1150 may extend through the aperture 1118. In some embodiments, the receiving member 1150 may include one or more bearing members 1152 configured to facilitate load handling and/or alignment during rotational movement of the receiving member 1150. The one or more bearing members 1152 may be of any suitable type (i.e., ball bearings, roller bearings, etc.) as understood by one of ordinary skill in the art. In at least some embodiments, the receiving member 1150 and the associated one or more bearing members 1152 may be substantially the same as those described above with respect to the joint module 100 in both structure and function, and the details thereof are therefore not repeated.

The joint module 1100 may include a coupling element 1106 configured to attach to the receiving member 1150. In some embodiments, the receiving member 1150 may be configured to hold the coupling element 1106 in a fixed position relative to the receiving member 1150. In some embodiments, the coupling element 1106 may be removably attached to the receiving member 1150. In some embodiments, the coupling element 1106 may be attached to the receiving member 1150 by a plurality of fasteners 1158. In some embodiments, the coupling element 1106 may be attached to the receiving member 1150 by other means such as, but not limited to, a keyed shaft, a set screw, a frangible bond or weld, a combination of these, or other suitable means. In some embodiments, the coupling element 1106 is disposed external to the housing 1110. In some embodiments, a coupling element 1106 may be disposed within a lumen of a tubular member 200 and aligned with a plurality of mounting holes 210 formed therein to serve as a means to mount the tubular member 200 (and any attached joint module(s) 1100) to a coupling element 1106 of another joint module 1100 and/or arm assembly. In some cases, this arrangement may be used to create a multiple arm and/or multiple function arm assembly based on the needs of a particular user.

In some embodiments, the powered motor 1140 may be operatively connected to the receiving member 1150 by a gear set 1160. In some embodiments, the powered motor 1140 and the gear set 1160 may be configured to permit continuous 360-degree rotation of the receiving member 1150 in a clockwise direction, a counterclockwise direction, or both. Generally, the receiving member 1150 may be configured to rotate in only a single plane. In other words, the receiving member 1150 may be configured to rotate about its central axis, wherein the central axis of the receiving member 1150 remains fixed within a single plane. However, other configurations are possible.

Figure 21:
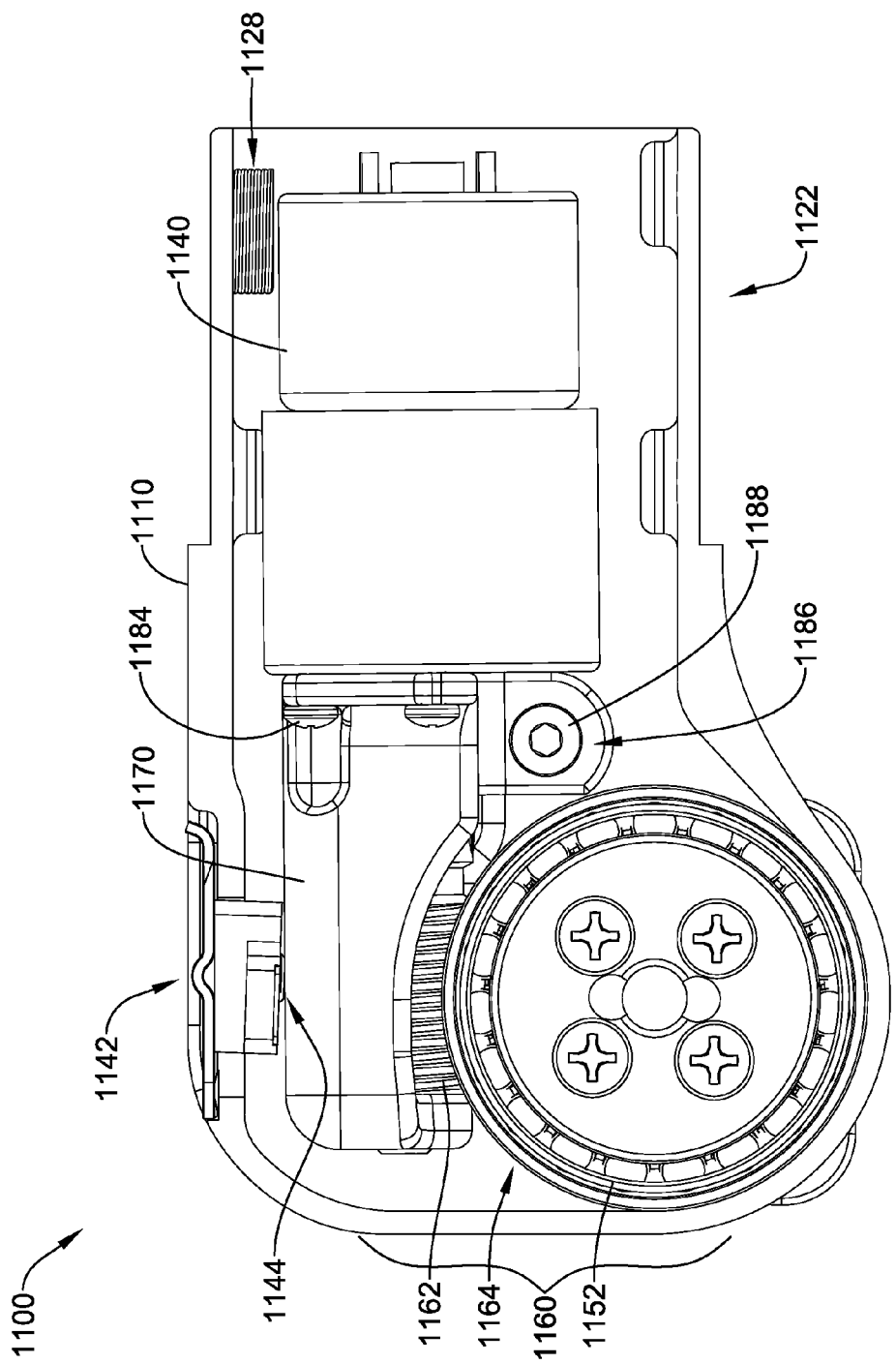
FIGS. 21-22 are bottom, partial cut-away views of the example joint module of FIG. 19.
Figure 22:
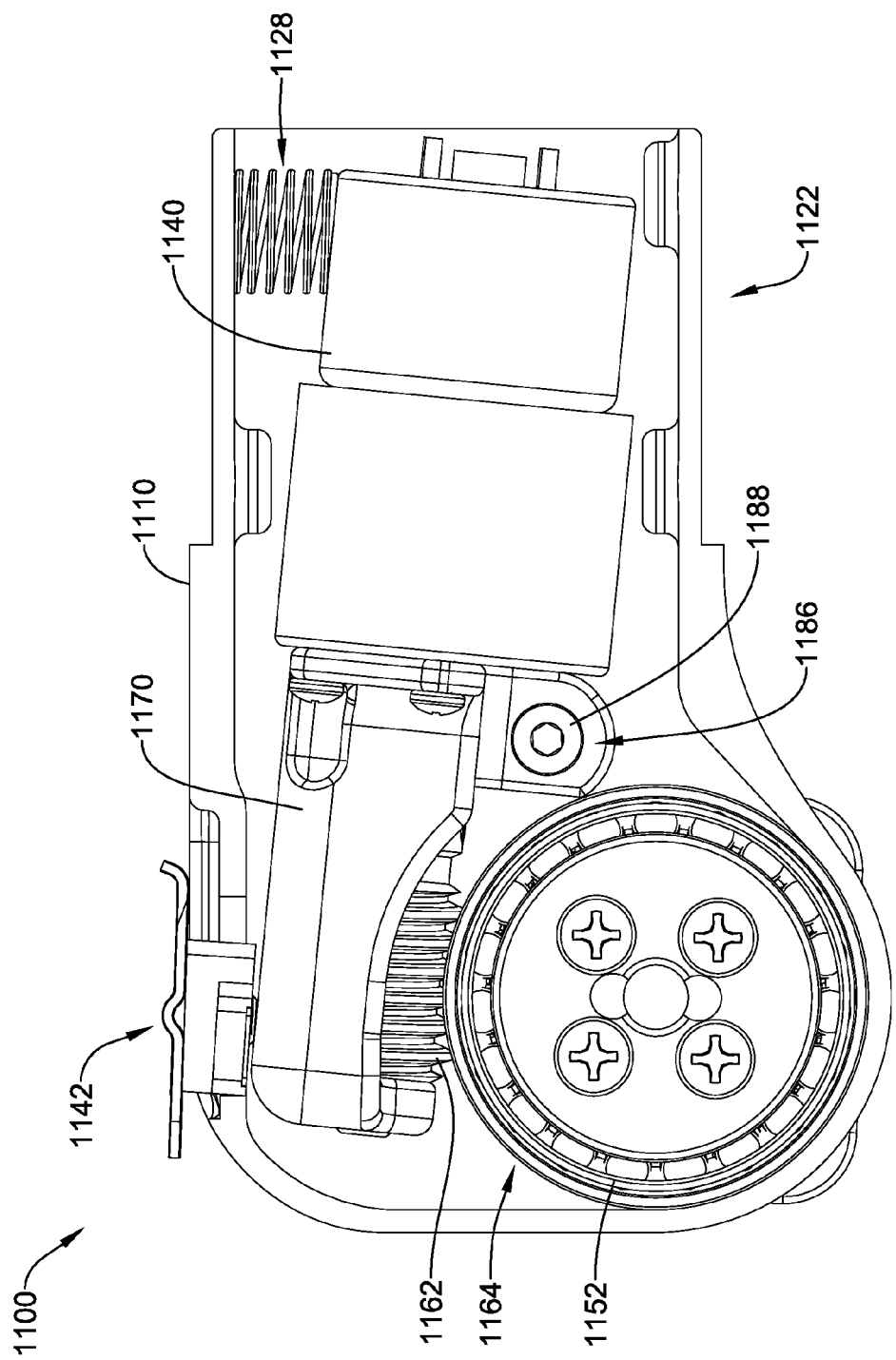
Figure 23:
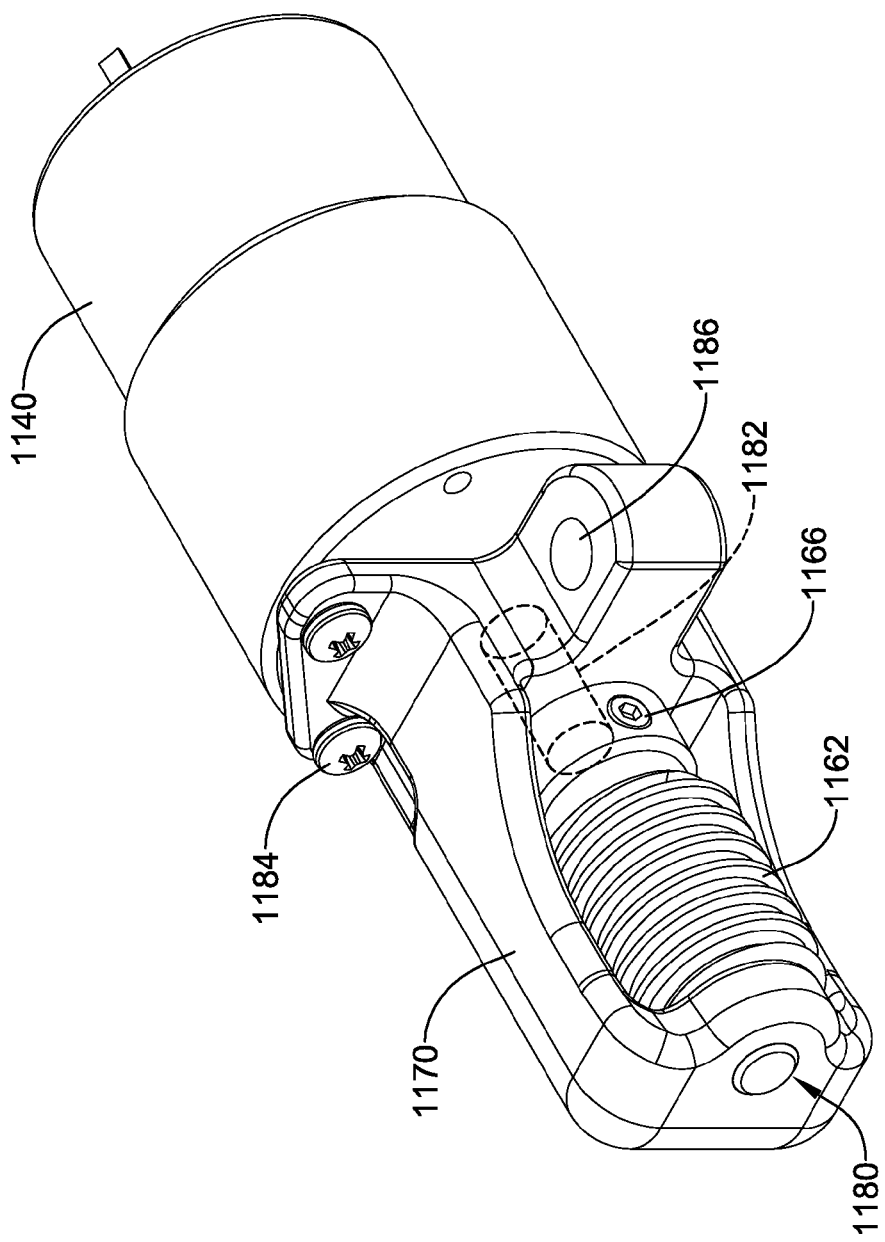
FIG. 23 is a perspective view of a portion of a powertrain assembly.

In some embodiments, the gear set 1160 may include a worm 1162 and a worm wheel 1164. Other gear types and/or combinations suitable for use herein are also contemplated. In some embodiments, the worm 1162 may be mounted within a worm carriage 1170. In at least some embodiments, the worm carriage 1170 may be a single, unitary piece or structure. An illustrative worm carriage 1170 may include a first hole or aperture 1180 disposed therein which rotatably receives a first end of the worm 1162, and a second hole or aperture 1182 disposed therein which rotatably receives the output of the powered motor 1140 therein. As shown in FIGS. 21-23, the first end of the worm 1162 may be received within the first hole or aperture 1180, and a second end of the worm 1162 may engage, may receive, or may be received by, the output of the powered motor 1140. In some embodiments, the output of the powered motor 1140 may include an output shaft received within the second end of the worm 1162 and secured thereto by a set screw 1166. In some embodiments, the first end of the worm 1162 may include a stub shaft protruding therefrom, and the stub shaft may be received within the first hole or aperture 1180 of the worm carriage 1170. Other arrangements are also contemplated. In some embodiments, an end of the powered motor 1140 may be fixedly attached to the worm carriage 1170. For example, in some embodiments, the powered motor 1140 may be fixedly attached to the worm carriage 1170 by one or more mechanical fasteners 1184, as seen in FIG. 23 for example. In some embodiments, the worm carriage 1170 may be captured or otherwise positioned within the hollow interior of the housing 1110 at or within the body portion 1120.

In some embodiments, the worm carriage 1170 may include a pivot hole 1186 configured to receive a pivot shaft 1188 therein. In some embodiments, the pivot shaft 1188 may include a pivot bolt, a pivot pin, a combination thereof, or other suitable structure, which may be fixed to the housing 1110. In use, the worm carriage 1170 may be configured to pivot about the pivot shaft 1188. In some embodiments, a coil spring 1128 may be positioned at the proximal mounting portion 1122 of the housing 1110, between an inner wall of the housing 1110 and the powered motor 1140. The coil spring 1128 may be biased to expand, thereby pushing an end of the powered motor 1140 away from the inner wall of the housing 1110 and pivoting the worm carriage 1170 about the pivot shaft 1188. In some embodiments, a slidable release switch 1142 at the body portion 1120 of the housing 1110 may be configured to actuate from a first position, as seen in FIG. 21 for example, to a second position, thereby permitting the coil spring 1128 to expand and the worm carriage 1170 to rotate about the pivot shaft 1188, as seen in FIG. 22 for example.

Rotation of the worm carriage 1170 about the pivot shaft 1188 may disengage the worm 1162 from the worm wheel 1164, which may be beneficial in adjusting the positioning of the receiving member 1150 and/or the mounting element 1106, or to permit movement of the joint module 1100 without power or the use of accessible controls, such as if a user's aide needs to move the arm assembly quickly to assist the user (e.g., if the user has aspirated and/or is choking on food, for example). In some embodiments, release of the joint module 1100 using the slidable release switch 1142 may be tool-less. In some embodiments, when the worm 1162 is disengaged from the worm wheel 1164, positioning information of the receiving member 1150 and/or the mounting element 1106 may be retained, even if movement occurs. In other words, position tracking is independent of engagement of worm 1162 with the worm wheel 1164 and/or the powered motor 1140.

In some embodiments, the release switch 1142 may include an adjustment screw 1144 rotatably disposed therein, wherein the adjustment screw 1144 is configured to contact the worm carriage 1170 and bias or urge the worm 1162 into engagement with the worm wheel 1164 when the release switch 1142 is in the first position. Clockwise rotation of the adjustment screw 1144 from outside of the housing 1110 (as seen in FIG. 20 for example) may move the screw towards the worm carriage 1170, while counterclockwise rotation of the adjustment screw 1144 may move the screw away from the worm carriage 1170. Alternatively, if the adjustment screw is configured for access from inside the housing 1110, clockwise rotation of the adjustment screw 1144 may move the screw away from the worm carriage 1170, while counterclockwise rotation may move the screw toward the worm carriage 1170. Moving the adjustment screw 1144 toward the worm carriage 1170 may urge the worm 1162 closer to the worm wheel 1164 when the release switch 1142 is in the first position.

In some embodiments, an output of the powered motor 1140 may rotate about a first axis and the worm 1162 may rotate about a second axis. In some embodiments, the first axis may be oriented generally parallel to the second axis. In some embodiments, the worm 1162 may be axially aligned with an output of the powered motor 1140. In some embodiments, the output of the powered motor 1140 and the worm 1162 may both rotate about the first axis. In some embodiments, the receiving member 1150 may rotate about a third axis spaced apart from the first axis, and the first axis may be oriented at about 90 degrees relative to the third axis. In some embodiments, the worm 1162 may rotate about a second axis oriented substantially perpendicular to the third axis. In at least some embodiments, the first axis and/or the second axis may not intersect with the third axis.

In some embodiments, components of the joint module 1100 and/or the arm assembly may prevent relative rotational movement of the receiving member 1150 and/or a means 600 of attaching a device caused by application of an external force (e.g., the effect of gravity upon a device being held or by movement resulting from an individual applying force thereto, such as depressing buttons on a cell phone or a speech generating device). In some embodiments, the worm 1162 and the worm wheel 1164 may be oriented at an angle relative to each other such that relative rotation and/or movement is prevented. In other words, the worm 1162 and the worm wheel 1164 engage in a way that prevents manual (i.e., non-powered and/or external) movement (i.e. overdrive) of the joint module and/or the arm assembly by an applied external force. In some embodiments, the worm 1162 may have an involute profile. In some embodiments, the worm wheel 1164 may include a curved profile configured to cup the worm 1162 when the worm 1162 and the worm wheel 1164 are engaged. In some embodiments, the powered motor 1140 and the control board 1190 may be configured to prevent rotational movement of the receiving member 1150 and/or a means 600 of attaching a device caused by the weight of a device being held or by movement resulting from an individual applying force thereto, such as depressing buttons on a cell phone or a speech generating device. In some embodiments, the worm 1162 and the worm wheel 1164 may engage in a way that prevents manual (i.e., non-powered and/or external) movement (i.e. overdrive) of the joint module and/or the arm assembly by an applied external force, even in a non-powered state.

In some embodiments, the joint module 1100 may include one or more means for providing electrical power to the powered motor 1140 from a source external to the joint module 1100. In some embodiments, the means for providing electrical power may include a direct connection, such as by wire(s), electromagnetic induction elements, and/or other wireless transfer of energy, as well as combinations of these or suitable alternatives. For example, a joint module 1100 may include electromagnetic induction elements directly connected to the powered motor 1140 by one or more wires. In some embodiments, a slip ring (not visible) may be positioned within the receiving member 1150 to permit energy transfer between the joint module 1100 and an adjacent tubular arm member 200 or other element as appropriate, and the slip ring may be operatively connected to the powered motor 1140 by one or more wires (not shown). In some embodiments, the slip ring may include and/or be connected to one or more wires configured to transfer electrical power, data, or other necessary or desired signals between the joint module 1100 and an adjacent tubular arm member 200 or other element. In some embodiments, an end cap 510 may be operatively connected to and/or in communication with the slip ring and/or the one or more wires connected to the slip ring to facilitate power and/or data transfer into, from, and/or through the joint module 1100 and/or an arm assembly. In some embodiments, the end cap 510 may be hard-wired or physically connected to the slip ring and/or the one or more wires connected to the slip ring.

In some embodiments, the housing 1110 may include a removable bottom cover 1130, as seen in FIGS. 19-20. In some embodiments, the removable bottom cover 1130 may be formed of or made from a suitable polymeric or plastic material. In some embodiments, the bottom cover 1130 may be configured to be removed from the housing 1110 in order to access certain elements disposed within the hollow interior of the housing 1110. In some embodiments, the joint module 1100 may include a control board 1190 disposed within the housing 1110. In some embodiments, the control board 1190 may be operatively connected to the powered motor 1140 to permit transfer of energy, commands, feedback, and/or other information or data therebetween. In some embodiments, the control board 1190 may be end-user programmable with one or more fixed rotational positions, or "sweet spots", of the receiving member 1150. In some embodiments, the control board 1190 may include a position sensor 1194, such as a hall effect sensor, configured to determine and/or track the rotational position of the receiving member 1150.

In some embodiments, the joint module 1100 may include a radio receiver and/or transceiver 1192 operatively connected to the control board 1190. In some embodiments, the radio receiver and/or transceiver 1192 may be disposed on the control board 1190. In some embodiments, the radio receiver and/or transceiver 1192 may be disposed separately (i.e., spaced apart from) the control board 1190 within, on, or attached to the housing 1110. In some embodiments, the radio receiver and/or transceiver 1192 may be configured to receive control signals wirelessly. In some embodiments, the radio receiver and/or transceiver 1192 may be configured to receive and/or send status updates, position information, error codes or messages, or other desired feedback or information. The radio receiver and/or transceiver 1192 may send and/or receive via a suitable wireless signal such as, but not limited to, Bluetooth, Wi-Fi, VHF, UHF, VLF, infrared, cellular, and the like. In some embodiments, the radio receiver and/or transceiver 1192 may include a discrete, remotely-mounted antenna (not shown) which may improve reception and/or transmission of wirelessly transmitted instructions, controls, data, and/or other appropriate information. In some embodiments, a polymeric or plastic bottom cover 1130 may facilitate and/or enhance wireless transmission and/or reception by the radio receiver and/or transceiver 1192. In some embodiments, the bottom cover 1130 may be translucent, thereby permitting an illuminated indicator light or light emitting diode (LED) disposed on the control board 1190 to be visible through the bottom cover 1130. In some situations, the LED may provide messages or feedback related to the operation of the joint module 1100 via color, blinking or blink pattern(s), or other suitable signals.

Figure 24:
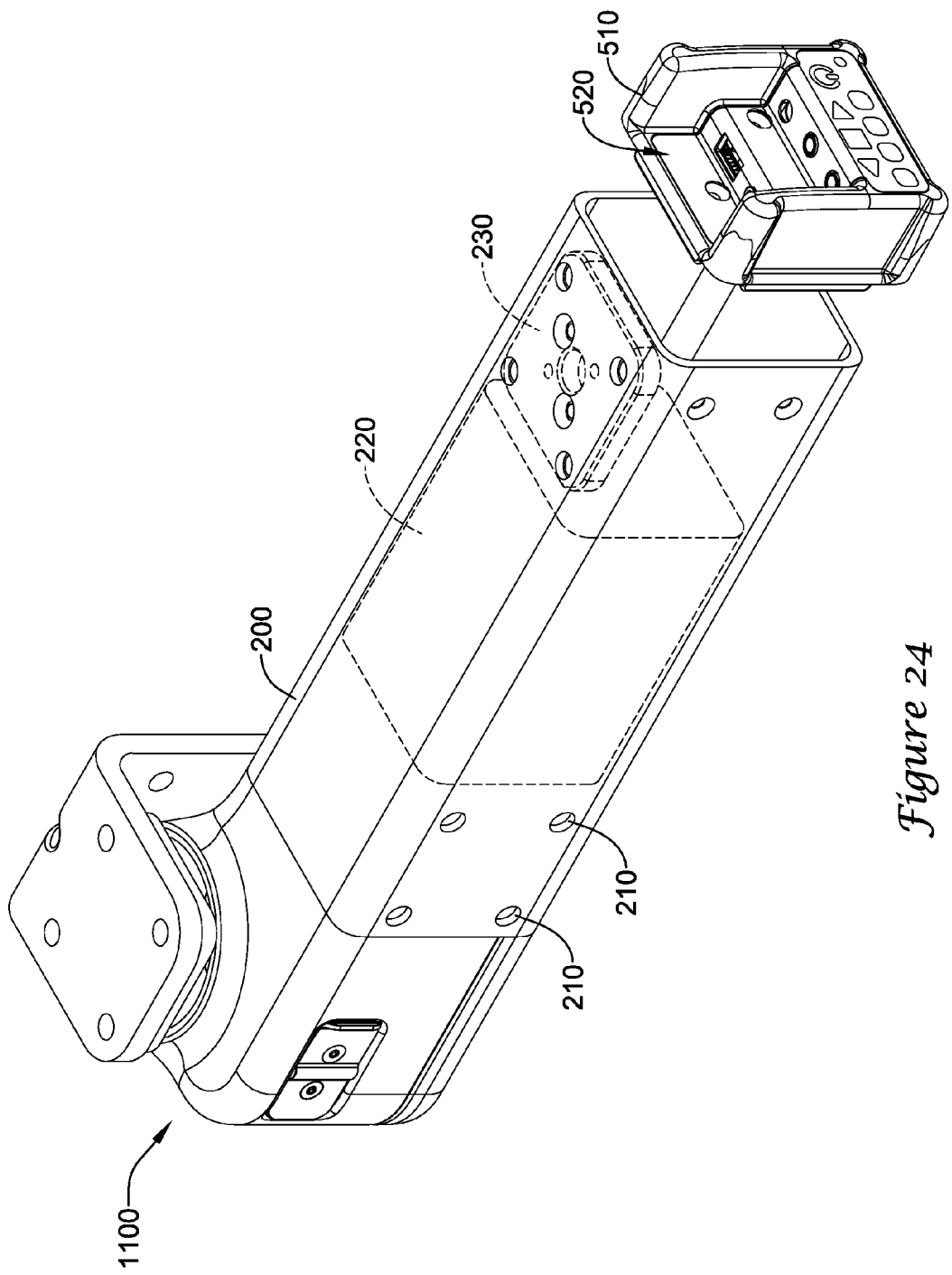
FIG. 24 is a perspective view of an example joint module and a tubular member.
Figure 29:
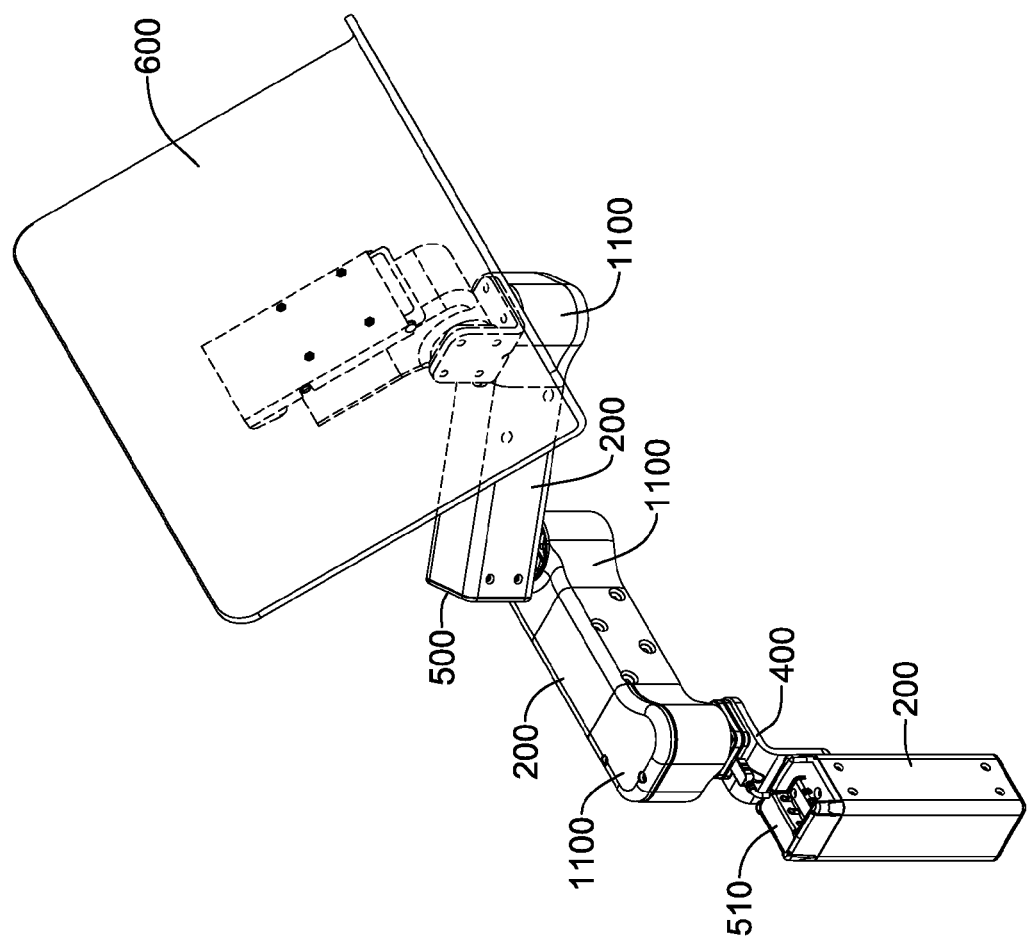
FIGS. 29-30 illustrate example embodiments of an assembly incorporating an example joint module and an illustrative means of attaching a personal-use device.
Figure 30:
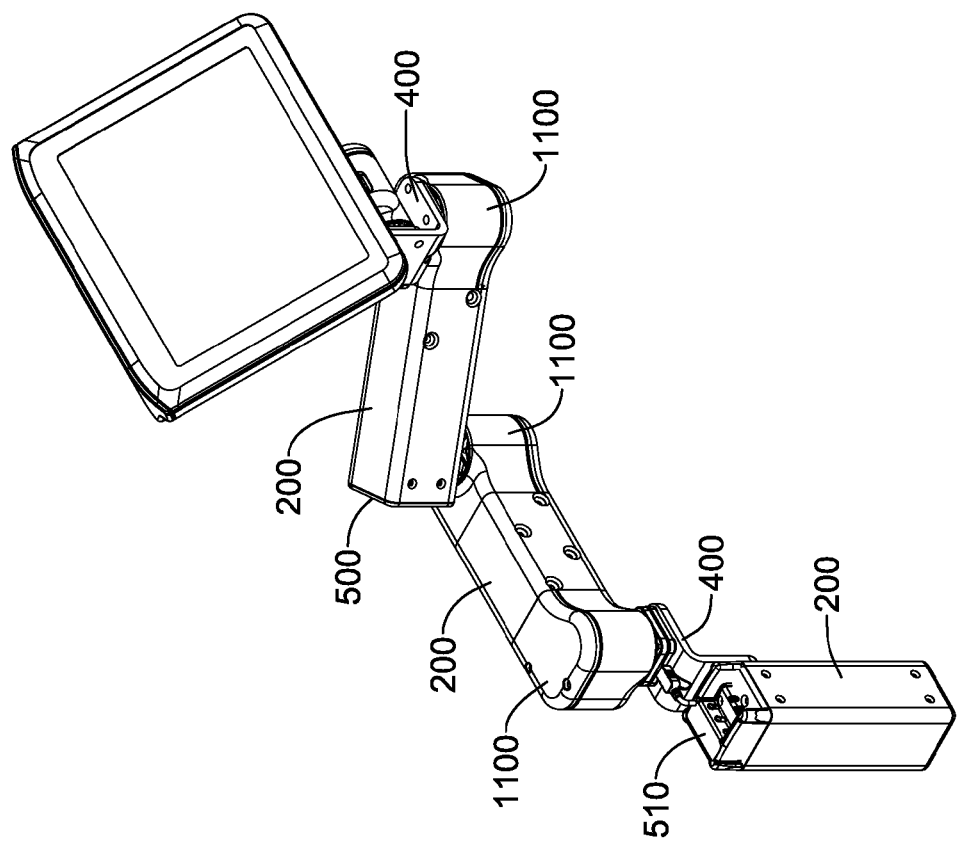

In some embodiments, a joint module 1100 may include a tubular member 200 attached thereto. In some embodiments, the tubular member 200 attached to the joint module 1100 may include a battery 220 disposed therein, as seen in FIG. 24 for example, the battery 220 being configured to power the powered motor 1140 disposed within the joint module 1100. In some embodiments, a battery 220 may be disposed within a tubular member 200 that is remote from a joint module 1100. In other words, a battery 200 may be disposed in a tubular member 200 that is not attached directly to the joint module 1100. In some embodiments, a remote battery 200 (such as within the tubular member 200 under the end cap 510 illustrated in FIGS. 29-30, where the battery 200 is not visible) may be electrically connected to, or in electrical communication with, one or more joint modules 1100. In some embodiments, the tubular member 200 may include a coupling member 230 disposed therein. In some embodiments, the structure of the coupling member 230 may be substantially similar to, or in some cases identical to, the coupling element(s) 106/1106. In some embodiments, the coupling member 230 may be used to connect a tubular member 200 and/or a corresponding or adjoining joint module 100/1100 (forming an assembly, for example) to a coupling element 106/1106 of another joint module 100/1100, as seen schematically (where the coupling member 230 is not visible) in FIGS. 8-11 and 29-30, for example.

In some embodiments, the joint module 1100 and/or the tubular member 200 may include an end cap 500/510, as described herein. In some embodiments, an end cap 500/510 may be attached to a plate disposed within the tubular member 200, wherein the plate is configured to attach the end cap 510 to the tubular member 200 in one or more orientations. The ability to connect the end cap 510 at different orientations may provide visual access, physical access, and/or control.

Figure 17:
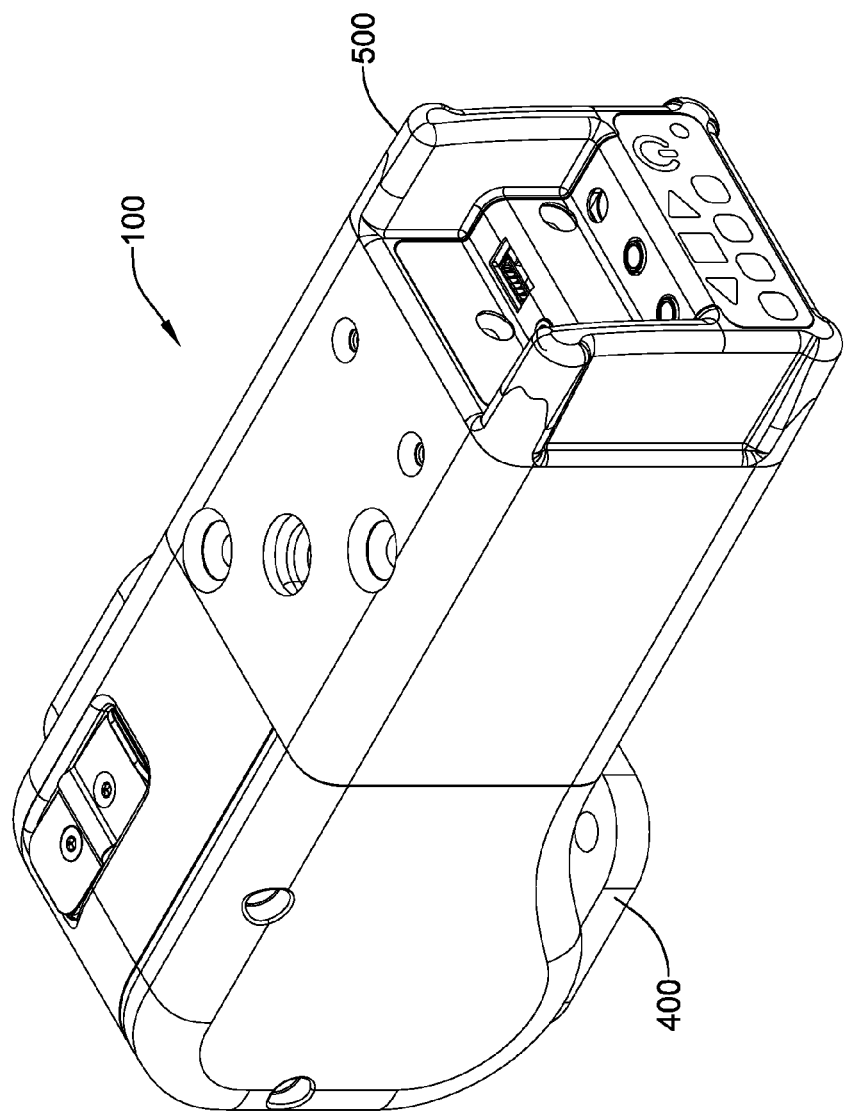
FIG. 17 illustrates an example joint module configured as a tilt mechanism.

In some embodiments, an end cap 500 may be generally featureless (i.e., generally flat with curved or rounded edges, and/or devoid of connectors), as seen in FIGS. 6-11 for example. In some embodiments, an end cap 510 may include a protective recessed connection area 520, as seen in FIGS. 17, 18, and 24 for example. In some embodiments, an end cap 510 may include one or more of the following: power (On-Off) switch, data ports, power supply connector, battery recharging jack or port, an external display jack, port, or connector, on-board switches to operate basic functions of the joint module(s)/arm assembly directly, and/or switch or control connectors for the user interface (i.e., control panel 800 for example, discussed in more detail below), or combinations of these (e.g., a combined data and power supply cable), disposed within the protective recessed connection area 520 that may help prevent connectors/plugs from being knocked out of place. In some embodiments, an end cap 510 may include one or more universal serial bus (USB) ports, ethernet ports, or other suitable connection(s). Within the current disclosure, the end cap 500 and the end cap 510 may be generally interchanged as needed or desired based upon connectivity and/or control needs. In some embodiments, alternate and/or accessible controls (i.e., a one button system, a two-button system, a puff-based system, a joystick, etc.) may be operatively connected to the joint module(s) 100/1100 and/or the arm assembly via an end cap 510. It will be understood by the skilled person that anywhere within the disclosure that the end cap 500 is used or described may be substituted with the end cap 510, and vice versa. In some embodiments, an arm assembly may include one end cap 510 and one or more end cap (or end plug) 500. In some embodiments, a plurality of end caps 510 may be present with a single end cap (or end plug) 500 provided. Alternatively, an arm assembly may include more than one of each of the end caps 500/510, depending on the configuration and/or desired connectivity.

Figure 25:
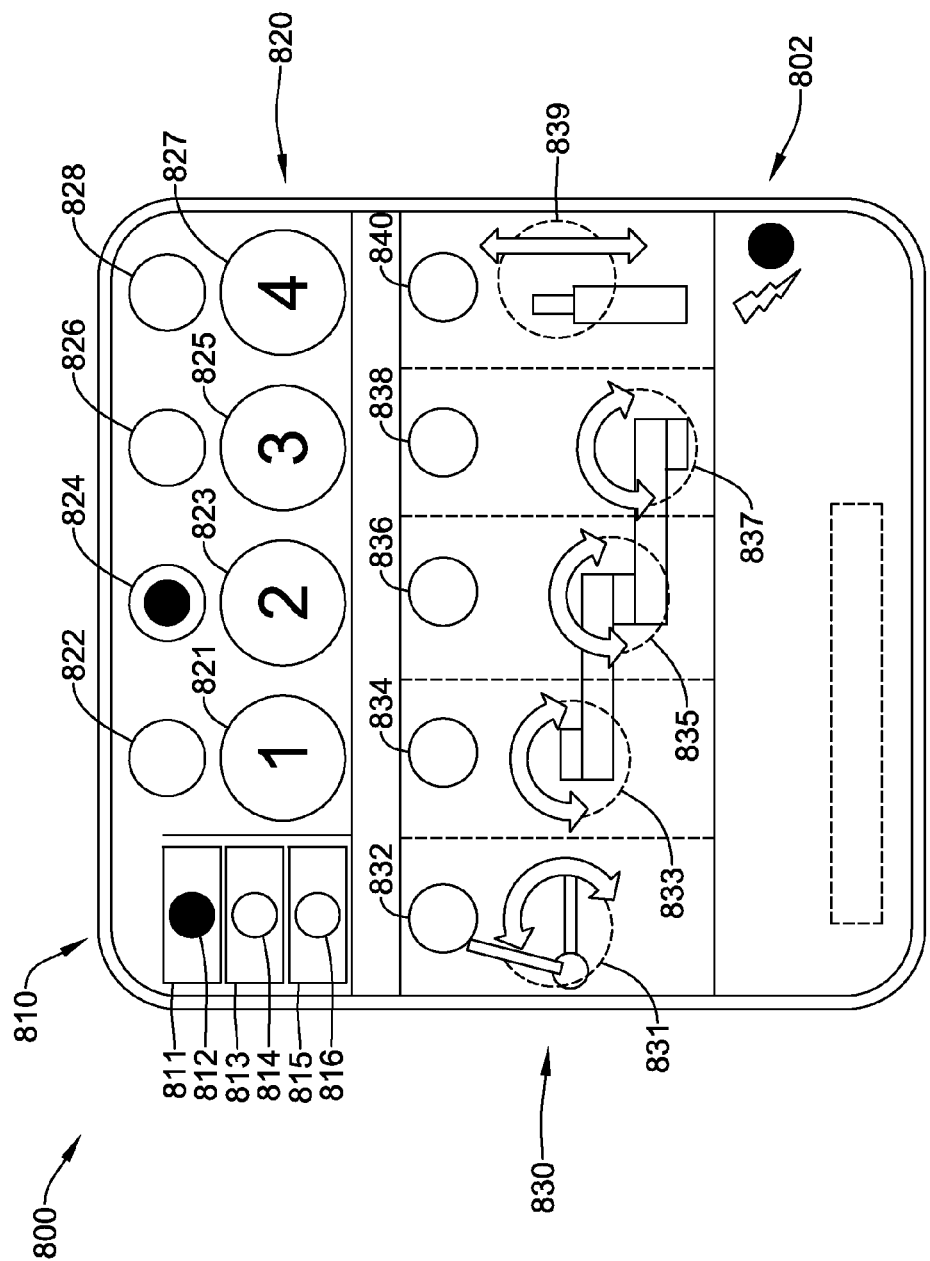
FIGS. 25-28 are illustrative views of an example control panel.

In some embodiments, the joint module 100/1100 may include a control panel 800, as seen in FIG. 25 for example. In some embodiments, the control panel 800 may control operation of a single joint module 100/1100 or a plurality of joint modules 100/1100, such as in an arm assembly as described above. In some embodiments, the control panel 800 may provide the ability to program a plurality of "sweet spots" controlling positioning of various elements of an arm assembly. In some embodiments, a single joint module 100/1100, a plurality of joint modules 100/1100, and/or the control panel 800 may be programmed using alternative/accessible controls.

In some embodiments, the control panel 800 may provide the ability to program each joint module 100/1100 with at least one set of location data, wherein activation of the control panel 800 via various control means discussed herein, directs the joint module(s) 100/1100 to move to the at least one set of location data. In some embodiments, the at least one set of location data may include two sets (i.e., a first set and a second set) of location data. In some embodiments, the at least one set of location data may include three sets (i.e., a first set, a second set, and a third set) of location data. In some embodiments, the at least one set of location data may include four sets (i.e., a first set, a second set, a third set, and a fourth set) of location data. In some embodiments, the at least one set of location data may include five or more sets (i.e., a first set, a second set, a third set, a fourth set, a fifth set, etc.) of location data. In at least some embodiments, a "sweet spot" may consist of, define, and/or otherwise correspond to one set of location data.

In some embodiments, the control panel 800 may provide the ability to program each joint module 100/1100 with a plurality of groups of location data, each group of location data including at least one set of location data. In some embodiments, the at least one set of location data may include two sets (i.e., a first set and a second set) of location data for one group, one or more groups, or each group. In some embodiments, the at least one set of location data may include three sets (i.e., a first set, a second set, and a third set) of location data for one group, one or more groups, or each group. In some embodiments, the at least one set of location data may include four sets (i.e., a first set, a second set, a third set, and a fourth set) of location data for one group, one or more groups, or each group. In some embodiments, the at least one set of location data may include five or more sets (i.e., a first set, a second set, a third set, a fourth set, a fifth set, etc.) of location data for one group, one or more groups, or each group. Various combinations of sets of location data may be provided for the plurality of groups.

In some embodiments, each group of location data may correspond to a different use or configuration. For example, the control panel 800 may provide the ability to program each joint module 100/1100 with a plurality of groups of location data corresponding to different users, different physical locations or environments, and/or different devices to control (i.e., different joint modules, for example—a group corresponding to the joint module(s) at a user's bed, a group corresponding to the joint module(s) at a user's desk, table, or workstation, and/or a group corresponding to the joint module(s) on a user's wheelchair or mobility device). In some embodiments, a low-power, localized wireless connection between the control panel 800 and the joint module(s) 100/1000 (i.e., Wi-Fi, Bluetooth, etc.) may permit the control panel 800 to operatively connect to (in some cases, automatically) and control any joint module(s) within range of the wireless signal that have been properly configured to accept input from the control panel 800, which may provide additional flexibility in programming different groups of location data. In some embodiments, the control panel 800 may be operatively connected to the joint module(s) using a hard-wired, physical connection, such as via the end cap 510, for example. In some embodiments, the control panel 800 may be a standalone device or interface proximate the joint module(s) being controlled. In some embodiments, the control panel 800 may be an application ("app") on a smartphone, tablet computer, laptop computer, personal digital assistant (PDA), or other electronic device.

In some embodiments, the control panel 800 may permit a programmer, an attendant, a caregiver, and/or a user to set a rotation speed of the joint module(s) 100/1100. In some embodiments, a "scan" rate of the control panel 800 may be set by a programmer, an attendant, a caregiver, and/or a user. A "scan" may permit selection of a particular position, joint module, and/or set or group of location data using an input device (i.e., button or switch, joystick, puffer device, etc.). In some embodiments, a "scan" may be stepped, or move in a discrete increment for each actuation of the input device (i.e., button press, etc.), until the input device is "held" for a predetermined period of time to indicate a selection. In some embodiments, a "scan" may be timed, moving between options or selections in sequence at a predetermined time interval until an input is made. In some embodiments, one or more indicator lights may be used to indicate the scan rate and/or the rotation speed.

In some embodiments, programming and adjustment of the joint module(s) and/or arm assembly may be made directly using the control panel 800. Reference numerals and quantities of inputs, displays, indicators, keys, etc. are purely illustrative in nature and are provided to enhance understanding of the function of the control panel 800. More or less of any feature may be present and/or used in any given embodiment. Initially, tapping on a "key" of the control panel 800 wakes the system up. Tapping or clicking on a level or group key 811/813/815 may select a desired level or group 810 for programming. In some embodiments, a single level or group key may be used, wherein subsequent taps may switch between levels or groups. A group indicator 812/814/816 may show which level or group is selected.

Next, a particular set of location data defining a target position or a "sweet spot" 820 may be selected by tapping or clicking on a sweet spot key 821/823/825/827. For the purpose of this application and the appended claims, the term "sweet spot" may be used interchangeably with the term "target position". In some embodiments, a single sweet spot key may be used, wherein subsequent taps may switch between sweet spots. A sweet spot indicator 822/824/826/828 may be provided to show which sweet spot is selected. Selection of a sweet spot may activate the joint module(s) and/or arm assembly, thereby prompting its movement to the selected sweet spot. In some embodiments, movement of the joint module(s) and/or arm assembly may be stopped en route to the sweet spot by tapping or clicking on the sweet spot key while the joint module(s) and/or arm assembly is moving. Pressing and holding the sweet spot key for a predetermined amount of time (e.g., 2 seconds, 3 seconds, 5 seconds, etc.) may reprogram the sweet spot (i.e., the set of location data defining a target position) to the then-current location of the joint module(s) and/or arm assembly.

In some embodiments, an individual joint position 830 may be selected by tapping or clicking a joint position key 831/833/835/837/839. In some embodiments, an arm assembly may include one or more height adjustable vertical members 300. For the purpose of explaining the programming and positioning of the device, the vertical member(s) 300 may be considered or referred to as a "joint" or a "joint module", even though the vertical member(s) 300 may or may not be capable of rotary or pivoting motion. In some embodiments, a single joint position key may be used, wherein subsequent taps may switch between joint positions. A joint position indicator 832/834/836/838/840 may be provided to show which joint position is selected. Tapping or clicking, and then holding, a joint position key 831/833/835/837/839 may activate the selected joint module, thereby moving it in a first direction. Releasing the joint position key (to deactivate the joint module) and tapping or clicking, and then holding, again may re-activate the selected joint module, thereby moving it in a second direction opposite the first direction. When a desired position is reached, the joint position key may be released and the selected joint module will deactivate or stop moving. As described above, a sweet spot, which may include a set of location data for the selected/moved joint module, may be saved or programmed by pressing and holding a sweet spot key for a predetermined amount of time.

In some embodiments, an alternative means of programming a sweet spot, either alone or in combination with the direct control(s) described above, may include releasing one or more joint modules 100/1100 by actuating the release switch(es) 1142 to the second position, as described above, and then manually moving the one or more joint modules 100/1100 to a desired target position or sweet spot. The release switch(es) 1142 may be actuated back to the first position, thereby locking the one or more joint modules 100/1100 into the target position, and then the sweet spot may be saved or programmed as described above. In some embodiments, the release switch(es) 1142 need not be actuated back to the first position prior to saving or programming the sweet spot at the desired target position—instead, the sweet spot key may be pressed and held for a predetermined amount of time as described above while the one or more joint modules 100/1100 are freely movable. As described above, position tracking is independent of engagement of the power/drive train components, and thus the location data will be retained.

In some embodiments, programming and adjustment of the joint module(s) and/or arm assembly may be made using a dual-switch system, wherein the control panel 800 serves primarily as a display. Reference numerals and quantities of inputs, displays, indicators, keys, etc. are purely illustrative in nature and are provided to enhance understanding of the function of the control panel 800. More or less of any feature may be present and/or used in any given embodiment. Initially, actuating one of a first switch or a second switch wakes the system up. In some embodiments, the first switch may function as a "step" switch and the second switch may function as a "select" switch. In some embodiments, the first switch and the second switch may be operatively connected to the joint module(s) and/or arm assembly via the end cap 510.

A level or group 810 may be selected by tapping or clicking on a group or level key 811/813/815. Alternatively, in some embodiments, a level or group 810 may be selected using alternative/accessible controls by "stepping" through the available levels or groups using the first switch, and then "selecting" the desired level or group using the second switch when a group indicator 812/814/816 on the control panel 800 indicates the desired level or group.

Moving the joint module(s) and/or arm assembly to a sweet spot 820 may be done by tapping or clicking on a sweet spot key 821/823/825/827. Alternatively, in some embodiments, a sweet spot 820 may be selected using alternative/accessible controls by "stepping" through the available sweet spots using the first ("step") switch, and then "selecting" the desired sweet spot using the second ("select") switch when a sweet spot indicator 822/824/826/828 on the control panel 800 indicates the desired sweet spot and then releasing the second ("select") switch. Movement of the joint module(s) and/or arm assembly may be interrupted by pressing and releasing either the first switch or the second switch. Movement to the selected sweet spot may be re-enabled or continued by pressing and releasing the second switch ("select"). Pressing and releasing the first switch ("step") may change to the next available sweet spot 820 known by (i.e., programmed into) the control panel 800.

Position adjustment of the joints or joint module(s) 100/1100 in a dual-switch system may occur in a similar manner. Selecting an individual joint module to a joint position 830 may be done by tapping or clicking on a joint position key 831/833/835/837/839. Alternatively, in some embodiments, a joint position 830 may be selected using alternative/accessible controls by "stepping" through the available joint positions using the first ("step") switch, and then "selecting" the desired joint position using the second ("select") switch when a joint position indicator 832/834/836/838/840 on the control panel 800 indicates the desired joint position. Upon selecting a joint position and continuing to hold the second ("select") switch, the selected joint module may begin to move in a first direction. Releasing the second ("select") switch may stop the selected joint module. To move the selected joint module in a second opposite direction, the second ("select") switch may be pressed and held again. To change to a different joint module, the first ("step") switch may be pressed and released, and the process repeated as needed or desired.

Saving or programming a particular set of location data defining a target position or a "sweet spot" 820 may be selected by tapping or clicking on a sweet spot key 821/823/825/827 to select the desired sweet spot. Alternatively, in some embodiments, a sweet spot 820 may be selected using alternative/accessible controls by "stepping" through the available sweet spots using the first ("step") switch, and then "selecting" the desired sweet spots using the second ("select") switch when a sweet spot indicator 822/824/826/828 on the control panel 800 indicates the desired sweet spot. Pressing and holding the second ("select") switch for a predetermined amount of time (e.g., 2 seconds, 3 seconds, 5 seconds, etc.) may reprogram the sweet spot (i.e., the set of location data defining a target position) to the then-current location of the joint module(s) and/or arm assembly.

In some embodiments, programming and adjustment of the joint module(s) and/or arm assembly may be made using a single-switch "step scan" system, wherein the control panel 800 serves primarily as a display. Reference numerals and quantities of inputs, displays, indicators, keys, etc. are purely illustrative in nature and are provided to enhance understanding of the function of the control panel 800. More or less of any feature may be present and/or used in any given embodiment. Initially, actuating the switch wakes the system up. In some embodiments, the first switch may function as a "step" switch when pressed and released, and the first switch may function as a "select" switch when pressed and held for a short period of time (e.g., 2 to 3 seconds, 5 seconds, etc.), wherein pressing and holding the first switch for a long period of time (e.g., greater than 5 seconds, greater than 10 seconds, etc.) may function to save or program a particular level or group, sweet spot, and/or joint position. In some embodiments, the first switch may be operatively connected to the joint module(s) and/or arm assembly via the end cap 510.

A level or group 810 may be selected by tapping or clicking on a level or group key 811/813/815. Alternatively, in some embodiments, a level or group 810 may be selected using alternative/accessible controls by "stepping" through the available levels or groups using the first switch, and then "selecting" the desired level or group by pressing and holding the first switch for 2-3 seconds when a group indicator 812/814/816 on the control panel 800 indicates the desired level or group and then releasing the first switch.

Moving the joint module(s) and/or arm assembly to a sweet spot 820 may be done by tapping or clicking on a sweet spot key 821/823/825/827. Alternatively, in some embodiments, a sweet spot 820 may be selected using alternative/accessible controls by "stepping" through the available sweet spots using the first switch, and then "selecting" the desired sweet spot by pressing and holding the first switch for 2-3 seconds when a sweet spot indicator 822/824/826/828 on the control panel 800 indicates the desired sweet spot and then releasing the first switch. Movement of the joint module(s) and/or arm assembly may be interrupted by pressing and releasing the first switch. Movement to the selected sweet spot may be re-enabled or continued by pressing and holding the first switch ("select"). Pressing and releasing the first switch ("step") may change to the next available sweet spot 820 known by (i.e., programmed into) the control panel 800.

Position adjustment of the joints or joint module(s) 100/1100 in a single-switch "step scan" system may occur in a similar manner. Selecting an individual joint module to a joint position 830 may be done by tapping or clicking on a joint position key 831/833/835/837/839. Alternatively, in some embodiments, a joint position 830 may be selected by "stepping" through the available joint positions using the first switch, and then "selecting" the desired joint position by pressing and holding the first switch for 2-3 seconds when a joint position indicator 832/834/836/838/840 on the control panel 800 indicates the desired joint position and then releasing the first switch. Upon selecting a joint position, pressing and releasing the first switch may begin to move the selected joint module in a first direction. Pressing and releasing the first switch during movement may stop the selected joint module. To continue moving the selected joint module in a second opposite direction, the first switch may be pressed and released again. To change to a different joint module, the first switch may be pressed and held for 2-3 seconds, and the process repeated as needed or desired.

Selecting a particular set of location data defining a target position or a "sweet spot" 820 for saving or programming may be done by tapping or clicking on a sweet spot key 821/823/825/827 to select the desired sweet spot. Alternatively, in some embodiments, a sweet spot 820 may be selected using alternative/accessible controls by "stepping" through the available sweet spots using the first switch. Pressing and holding the first switch for a predetermined amount of time (e.g., greater than 5 seconds, greater than 10 seconds, etc.) may then reprogram the sweet spot (i.e., the set of location data defining a target position) to the then-current location of the joint module(s) and/or arm assembly.

In some embodiments, programming and adjustment of the joint module(s) and/or arm assembly may be made using a single-switch "time scan" system, wherein the control panel 800 serves primarily as a display. Reference numerals and quantities of inputs, displays, indicators, keys, etc. are purely illustrative in nature and are provided to enhance understanding of the function of the control panel 800. More or less of any feature may be present and/or used in any given embodiment. Initially, actuating the switch wakes the system up. In some embodiments, the first switch may function as a "select" switch when pressed and released, and the first switch may function as a "press and hold" switch when pressed and held for a short period of time (e.g., 2 to 3 seconds, 5 seconds, etc.), wherein pressing and holding the first switch for a long period of time (e.g., greater than 5 seconds, greater than 10 seconds, etc.) may function to save or program a particular level or group, sweet spot, and/or joint position. In some embodiments, the first switch may be operatively connected to the joint module(s) and/or arm assembly via the end cap 510.

Initially, after waking the system up, a "row" (i.e., level or group 810, sweet spot 820, joint position 830, etc.) will be selected. In a timed sequence ("scan"), one "row" will illuminate, extinguish, and then a different "row" will illuminate and then extinguish. The "rows" will continue to cycle or rotate ("scan") until a selection is made, or until a predetermined amount of time (i.e., 15 seconds, 20 seconds, 30 seconds, etc.) passes with no selection being made, at which time the system may return to an "operation" mode. Pressing and releasing the first switch when a desired "row" is illuminated will select that "row" for use.

In some embodiments, the "row" of levels or groups 810 may be selected. After selection of the row of levels or groups 810, a group indicator 812/814/816 on the control panel 800 indicating an individual level or group key 811/813/815 will "scan" or cycle in a timed sequence. Pressing and releasing the first switch when a desired level or group key is illuminated will select that level or group key for use. Pressing and holding the first switch for 2-3 seconds may leave the level or group selection process and return to the row scan.

Moving the joint module(s) and/or arm assembly to a sweet spot 820 may be done by selecting the "row" of sweet spots 820. After selection of the row of sweet spots 820, a sweet spot indicator 822/824/826/828 on the control panel 800 indicating an individual sweet spot key 821/823/825/827 will "scan" or cycle in a timed sequence. Pressing and releasing the first switch when a sweet spot indicator 822/824/826/828 on the control panel 800 indicates the desired sweet spot will select that sweet spot for use and initiate movement of the joint module(s) 100/1100 and/or arm assembly to the selected sweet spot. Movement of the joint module(s) and/or arm assembly may be interrupted by pressing and releasing the first switch. Movement to the selected sweet spot may be re-enabled or continued by pressing and holding the first switch for 2-3 seconds. Pressing and releasing the first switch may return to scanning the row of sweet spots 820 for selection of a sweet spot.

Position adjustment of the joints or joint module(s) 100/1100 in a single-switch "time scan" system may occur in a similar manner. Selecting an individual joint module to a joint position 830 may be done by first selecting the row of joint positions 830. After selection of the row of joint positions 830, a joint position indicator 832/834/836/838/840 on the control panel 800 indicating an individual joint position key 831/833/835/837/839 will "scan" or cycle in a timed sequence. Pressing and releasing the first switch when the joint position indicator 832/834/836/838/840 on the control panel 800 indicates the desired joint position will select that joint position for use and initiate movement of the joint module 100/1100 associated with that joint position in a first direction. Movement of the joint module may be interrupted by pressing and releasing the first switch. Movement of the same joint module in a second direction opposite the first direction may be initiated by pressing and releasing the first switch again. Pressing and holding the first switch for 2-3 seconds may return to scanning the row of joint positions 830 for selection of a different joint position and/or joint module, and the process repeated as needed or desired.

Selecting a particular set of location data defining a target position or a "sweet spot" 820 for saving or programming may be done by tapping or clicking on a sweet spot key 821/823/825/827 to select the desired sweet spot. Alternatively, in some embodiments, a sweet spot 820 may be selected by "scanning" through the available sweet spots using alternative/accessible controls. Pressing and holding the first switch for a predetermined amount of time (e.g., greater than 5 seconds, greater than 10 seconds, etc.) may then reprogram the sweet spot (i.e., the set of location data defining a target position) to the then-current location of the joint module(s) and/or arm assembly.

Figure 26:
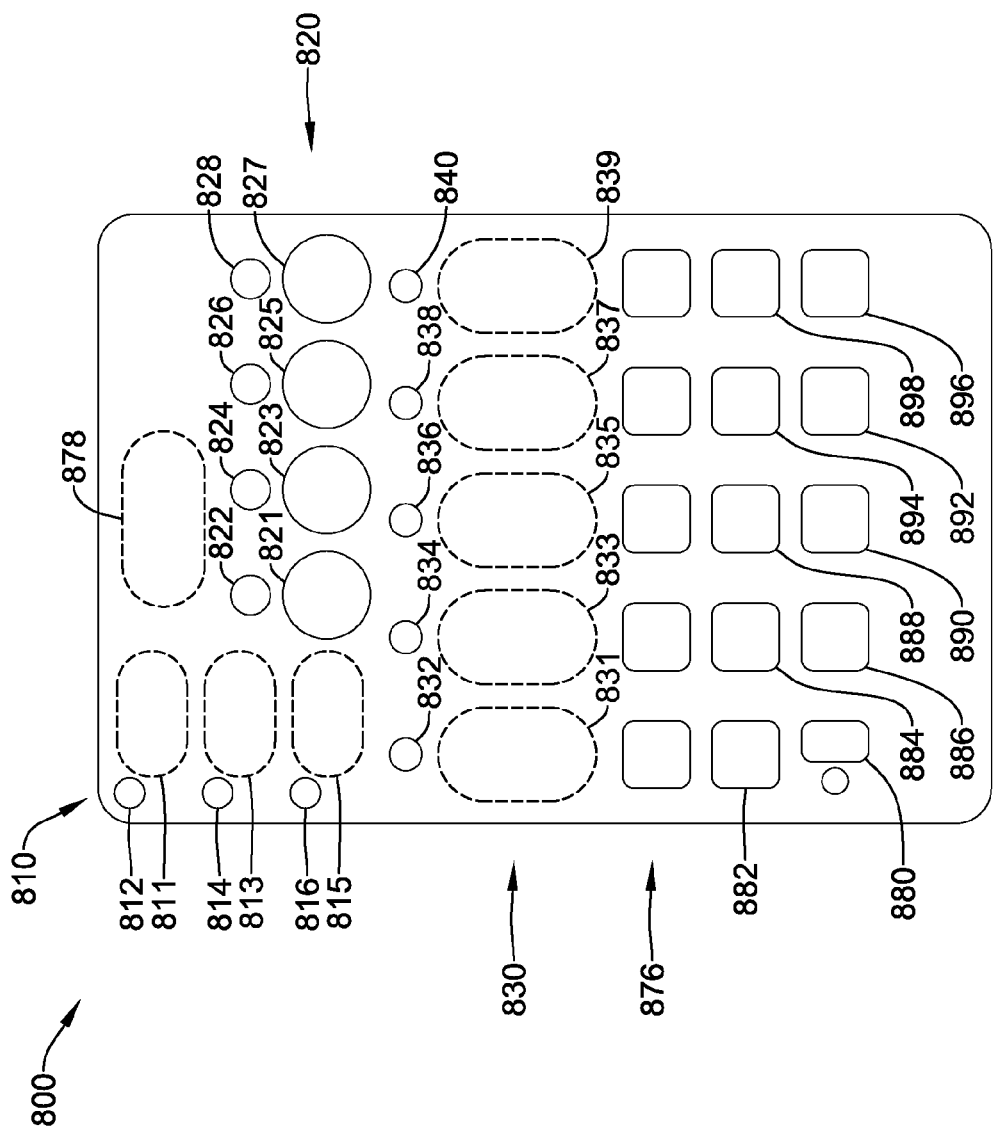
Figure 27:
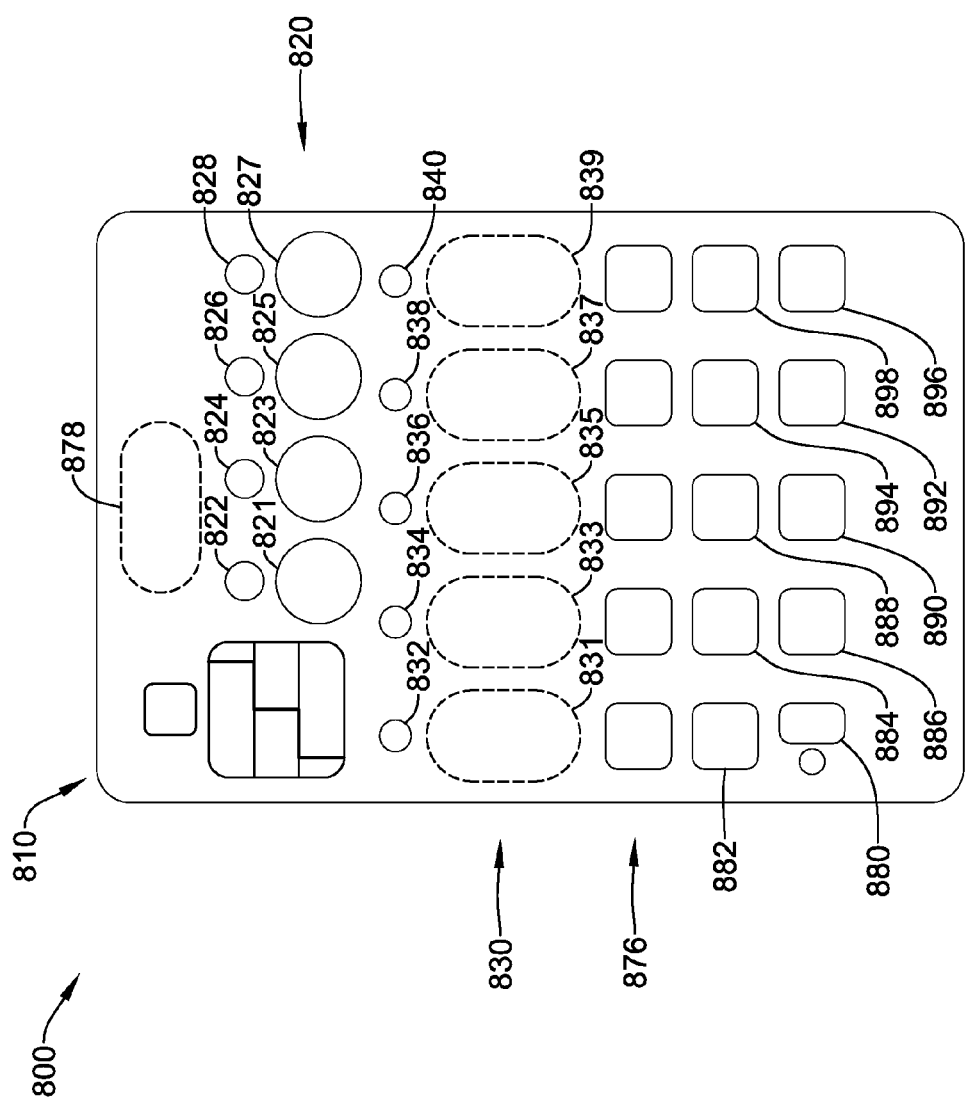
Figure 28:
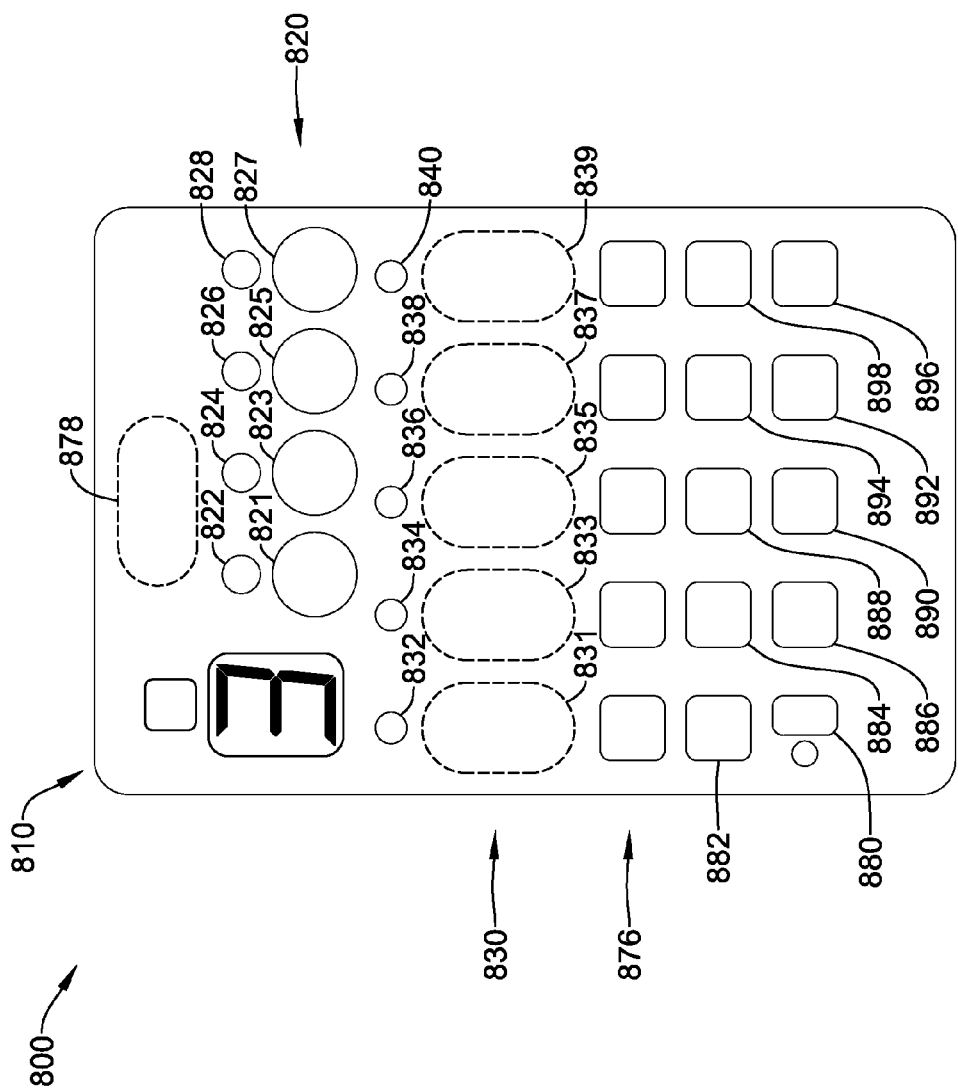

In some embodiments, a control panel 800 may include a variety of additional or other buttons, indicators, and/or functions. In some embodiments, a control panel 800 may include a power indicator 802 (as seen in FIG. 25, for example) configured to illuminate when the control panel 800 is powered on and/or is receiving a proper and/or necessary amount of power. In some embodiments, the power indicator 802 may include a power button (which may or may not be integrated with the power indicator 802) for switching the control panel 800 on and off. In some embodiments, a control panel 800 may include a discrete power button 878 (which may or may not include a power indicator) for switching the control panel 800 on and off, as seen in FIGS. 26-28, for example. In some embodiments, a control panel 800 may include a battery indicator and/or button 880. The battery indicator may display a status (e.g., remaining power level) of a battery, if the system is so equipped, for approximately three seconds and the battery indicator may then turn off. In some embodiments, a control panel 800 may include a setting or configuration button 882, which upon being pressed may activate certain buttons and/or functions on the control panel 800 to permit changes to the setting(s) and/or configuration(s) thereof.

In some embodiments, a control panel 800 may include a lockout button 884 and an unlock button 886, as seen in FIGS. 26-28, for example. The lockout button 884 may disable the use of certain buttons and/or functions—to prevent accidental changes to the settings or configurations, for example. In some embodiments, the unlock button 886 may re-enable the use of specific buttons and/or functions, particularly those that were previously disabled using the lockout button 884. In some embodiments, a predetermined or user-set key combination or code may need to be entered after pressing the unlock button 886 to disengage the lockout. In some embodiments, a control panel 800 lacking a discrete unlock button may need a pre-determined or user-set key combination or code to be entered to unlock the control panel 800 for changes and/or adjustments. In some embodiments, the control panel 800 may automatically lock after a predetermined period of time of inactivity.

In some embodiments, a control panel 800 may include a volume button 888 and/or a mute button 890. In some embodiments, the volume button 888 may be used to adjust audio output volume, or the volume button 888 may be used to simply select the volume for adjustment (for example, using increase and/or decrease button(s) described below). In some embodiments, the volume button 888 may operate in a "step" mode (where each press incrementally increases the volume until a peak is reached, at which point the volume resets to the lowest setting) or a "scan" mode (where the button may be pressed and held to increase the volume until the desired level is achieved). In some embodiments, a volume button may include discrete volume up and volume down adjustments—such as (but not limited to) two distinct buttons, a single button operable in different ways or directions (e.g., rocker switch, slider, rotary knob), etc. In some embodiments, a mute button 890 may be used to end or mute audio output and/or feedback. Pressing the mute button 890 a second time may re-enable audio output.

In some embodiments, a control panel 800 may include an increase button 894 and a decrease button 892. In some embodiments, the increase button 894 and the decrease button 892 may be used to adjust a selected function, setting, level, or configuration. In some embodiments, the increase button 894 may function as a volume up button and the decrease button 892 may function as a volume down button. In some embodiments, the increase button 894 may be used to increase joint motor speed and/or scan speed. In some embodiments, the decrease button 892 may be used to decrease joint motor speed and/or scan speed. Other uses, adjustments, and/or configurations are also contemplated.

In some embodiments, a control panel 800 may include a joint motor speed button 898. In some embodiments, the joint motor speed button 898 may be used to adjust a joint motor speed, or the joint motor speed button 898 may be used to simply select a joint motor speed for adjustment (for example, using increase and/or decrease button(s) described above). In some embodiments, a joint motor speed button 898 may operate in a "step" mode (where each press incrementally increases the joint motor speed until a peak is reached, at which point the joint motor speed resets to the lowest setting) or a "scan" mode (where the button may be pressed and held to increase the joint motor speed until the desired level is achieved). In some embodiments, a joint motor speed button 898 may include discrete joint motor speed up and joint motor speed down adjustments—such as (but not limited to) two distinct buttons, a single button operable in different ways or directions (e.g., rocker switch, slider, rotary knob), etc. During adjustment of a joint motor speed, one or more indicators on the control panel may illuminate to display a currently selected joint motor speed. For example, in some embodiments, a "sweet spot" indicator 822/824/826/828 may illuminate to display a current joint motor speed, wherein a sweet spot indicator disposed farther to the right may correspond to or indicate a higher joint motor speed. In some embodiments, a joint motor speed could be adjusted by selecting one of the "sweet spot" keys 821/823/825/827, wherein a sweet spot key disposed farther to the right may correspond to or select a higher speed.

In some embodiments, a control panel 800 may include a scan speed button 896. In some embodiments, the scan speed button 896 may be used to adjust a scan speed, or the scan speed button 896 may be used to simply select a scan speed for adjustment (for example, using increase and/or decrease button(s) described above). In some embodiments, a scan speed button 896 may operate in a "step" mode (where each press incrementally increases the scan speed until a peak is reached, at which point the scan speed resets to the lowest setting) or a "scan" mode (where the button may be pressed and held to increase the scan speed until the desired level is achieved). In some embodiments, a scan speed button 896 may include discrete scan speed up and scan speed down adjustments—such as (but not limited to) two distinct buttons, a single button operable in different ways or directions (e.g., rocker switch, slider, rotary knob), etc. During adjustment of a scan speed, one or more indicators on the control panel may illuminate to display a currently selected scan speed. For example, in some embodiments, a "sweet spot" indicator 822/824/826/828 may illuminate to display a current scan speed, wherein a sweet spot indicator disposed farther to the right may correspond to or indicate a higher scan speed. In some embodiments, a scan speed could be adjusted by selecting one of the "sweet spot" keys 821/823/825/827, wherein a sweet spot key disposed farther to the right may correspond to or select a higher speed.

Additionally, or alternatively, in some embodiments, provisions may be made in a control panel 800 for one or more additional buttons 876. In some embodiments, the one or more additional buttons 876 may be user-programmable for various functions or uses. In some embodiments, the one or more additional buttons 876 may be placeholders for additional functions or functionality added to the control panel 880 at a later date by the designer, manufacturer, distributor, etc. For example, in some embodiments, the one or more additional buttons 876 could be used to control a particular device attached to a corresponding joint module 1100 and/or accessibility-enhancing arm assembly (e.g., power on/off, memory settings, switching between input devices, etc.)

In some embodiments, an end cap 510 may include one or more buttons, functions, controls, or subsets thereof corresponding to the buttons, functions, and/or controls of the control panel 800. In other words, in some embodiments, one or more functions of the control panel 800 may be duplicated by or alternatively controllable directly from the end cap 510. In some embodiments, one end cap 510 may correspond to and/or control a single joint module 100/1100. In some embodiments, each joint module 100/1100 may correspond to and/or be controlled by one end cap 510. In some embodiments, one end cap 510 may correspond to and/or control a plurality of joint modules 100/1100.

In some embodiments, a joint module 100/1100 and/or an accessibility-enhancing arm assembly may include an accessible control operatively connected to the control panel 800 and/or the end cap 510. In some embodiments, the accessible control may include an adaptive switch, a voice input device, an eye gaze input device, a joystick, a touch-sensitive device, or other suitable input or control means.

In some embodiments, the joint module(s) 100/1100, when combined with tubular members 200 of various lengths, allow for creation of a plurality of different arm assembly lengths. The plurality of different arm assembly lengths possible within the present disclosure permits quick, easy, and cost-effective creation of a system that suits a particular user's needs and/or size.

Additionally, an arm assembly may include one or more of various safety features and/or behaviors. For example, if an arm assembly encounters an obstruction during movement, the arm assembly may immediately cease movement, may reverse direction and move away from the obstruction, or both (i.e., back off and stop). In some embodiments, a pressure switch, a torque-sensing device, a presence-sensing device, or other device/mechanism may provide feedback to the arm assembly and/or the control board. In some embodiments, an obstruction may detected by monitoring, calculating, and/or measuring a positional change (i.e., amount of movement) compared to or over a period of time (e.g., degrees of rotation per millisecond). In some embodiments, an obstruction may detected by monitoring, calculating, and/or measuring electrical draw (i.e., current/amperes, voltage, etc.) and comparing against a known or expected usage (i.e., a reference chart). In at least some embodiments, once an obstruction has been encountered and the arm assembly ceases movement, the control(s) must be re-actuated and/or re-activated in order for the arm assembly to resume movement in the original direction.

Having thus described some embodiments of the present disclosure, those of skill in the art will readily appreciate that other embodiments may be made and used which fall within the scope of the claims attached hereto. It should be under- stood that this disclosure is, in many respects, only illustrative. Changes may be made in details, particularly in matters of shape, size, and arrangement of steps without exceeding the scope of the disclosure. The disclosure's scope is, of course, defined in the language in which the appended claims are expressed.

What is claimed is:

1. An accessibility-enhancing joint module, comprising:
a housing including a proximal mounting portion;
a motor disposed within the housing;
a rotatable receiving member operatively connected to the motor;
a coupling element configured to attach to the receiving member and exposed external to the housing; and
a control board disposed within the housing and operatively connected to the motor;
a tubular arm member having a first end received about a proximal mounting portion of the housing;
an on-board battery disposed within the tubular arm member, the battery being configured to supply electrical energy to the motor; and
an end cap disposed within a second end of the tubular arm member, the end cap having one or more connection ports disposed therein, the connection ports being configured to connect to an accessible control such that the control board is operatively connected to the accessible control.

2. The joint module of claim 1, further including a radio receiver operatively connected to the control board, the radio receiver configured to receive control signals wirelessly.

3. The joint module of claim 1, further including a radio transceiver operatively connect to the control board, the radio transceiver configured to receive or transmit control signals wirelessly.

4. The joint module of claim 1, wherein the control board is end-user programmable with one or more fixed rotational positions of the receiving member.

5. The joint module of claim 1, wherein the motor is operatively connected to the receiving member by a gear set.

6. The joint module of claim 5, wherein the gear set includes a worm and a worm wheel.

7. The joint module of claim 6, wherein the worm is axially aligned with an output of the motor.

8. The joint module of claim 6, wherein an output of the motor rotates about a first axis and the worm rotates about an axis that is oriented generally perpendicular to the first axis.

9. The joint module of claim 6, further comprising a release switch that is movable between a first position in which the worm is engaged with the worm wheel and a second position in which the worm is disengaged from the worm wheel.

10. The joint module of claim 1, further including a control panel operatively connected thereto.

11. The joint module of claim 10, further including an accessible control operatively connected to the control panel.

12. An accessibility-enhancing arm assembly, comprising:
a first joint module including:
a housing having a body portion and a proximal mounting portion;
a motor disposed within the housing; and
a rotatable receiving member operatively connected to the motor;
a first tubular arm member matingly attached to the proximal mounting portion of the first joint module;
a second tubular member spaced apart from the first tubular member, the second tubular member having an end cap including one or more connection ports disposed therein matingly attached to the second tubular arm member; and
a battery disposed within the second tubular arm member for powering the first joint module;
wherein the end cap is operatively connected to the first joint module.

13. An accessibility-enhancing joint module, comprising:
a housing including a proximal mounting portion configured to accommodate a tubular arm member within the proximal mounting portion;
a motor disposed within the housing;
a gear set including a worm and a worm wheel, the worm disposed within a worm carriage that is pivotally coupled to the housing, the gear set operably coupled to the motor;
the worm carriage pivotable between a first position in which the worm is engaged with the worm wheel and a second position in which the worm is disengaged from the worm wheel;
a spring biasing the worm carriage towards the second position;
a releasable switch movable between a locked position in which the worm carriage is held in the first position and an unlocked position in which the worm carriage is free to move towards the second position; and
a control board disposed within the housing and operatively connected to the motor.

14. The joint module of claim 13, further comprising a receiving member operably coupled to the gear set.

15. The joint module of claim 14, wherein moving the releasable switch to the unlocked position enables quick adjustment of a position of the receiving member.

16. The joint module of claim 13, wherein the releasable switch is configured to be adjustable with respect to a spacing between the worm and the worm wheel.

17. The joint module of claim 14, wherein the control board is configured to recognize a relative position of the receiving member regardless of whether the worm was engaged or disengaged from the worm wheel during any movement of the receiving member.

18. The joint module of claim 13, wherein the control panel is configured to store a plurality of user-programmable target positions for the joint module.

19. The joint module of claim 13, wherein the control board is end-user programmable with one or more fixed rotational positions of the receiving member.

20. The joint module of claim 13, wherein the joint module is configured to be secured relative to a wheelchair in order to position an electronic device for use by a user sitting in the wheelchair.

* * * * *